US011755294B2

United States Patent
Yu et al.

(10) Patent No.: US 11,755,294 B2
(45) Date of Patent: Sep. 12, 2023

(54) SYSTEMS AND METHODS FOR GENERATING SERVICE ACCESS POINTS FOR RTE SERVICES IN CODE OR OTHER RTE SERVICE INFORMATION FOR USE WITH THE CODE

(71) Applicant: The MathWorks, Inc., Natick, MA (US)

(72) Inventors: Biao Yu, Sharon, MA (US); Peter S. Szpak, Newton, MA (US); Yuan Cao, Holliston, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/332,205

(22) Filed: May 27, 2021

(65) Prior Publication Data
US 2021/0382698 A1     Dec. 9, 2021

Related U.S. Application Data

(60) Provisional application No. 63/036,473, filed on Jun. 9, 2020.

(51) Int. Cl.
*G06F 9/44* (2018.01)
*G06F 8/35* (2018.01)
(Continued)

(52) U.S. Cl.
CPC ............... *G06F 8/355* (2013.01); *G06F 8/10* (2013.01); *G06F 8/20* (2013.01); *G06F 8/60* (2013.01)

(58) Field of Classification Search
CPC ....................................................... G06F 8/355
(Continued)

(56) References Cited

U.S. PATENT DOCUMENTS 8,448,130 B1      5/2013   Pillarisetti et al.
8,615,385 B1 *   12/2013   Aldrich ................... G06F 30/33
                                                                  703/2
(Continued)

OTHER PUBLICATIONS

AUTOSAR: "Specification of RTE AUTOSAR Release 4.2.2"; Jul. 31, 2015.*

(Continued)

*Primary Examiner* — Francisco J Aponte
(74) *Attorney, Agent, or Firm* — Cesari and McKenna, LLP

(57) ABSTRACT

Systems and methods may generate code, for a model, with one or more service access points generated and at locations in the code based on an analysis of model constraints and deployment specifications (e.g., RTE specifications or OS specifications). The systems and methods may analyze the model and identify a functionality that needs an RTE service. The system and methods may receive deployment specifications. The systems and methods may generate code for the model, where an analysis of model constraints and the deployment specifications determine which service access points are generated and where in the code the service access points are located. In an embodiment, the code may be executed by different RTEs. In an embodiment, the systems and methods may determine, based on the analysis of the model constraints and the deployment specification, one or more admissible implementations for an RTE service that may be implemented in different ways.

24 Claims, 13 Drawing Sheets

(51) Int. Cl.
*G06F 8/10* (2018.01)
*G06F 8/20* (2018.01)
*G06F 8/60* (2018.01)

(58) Field of Classification Search
USPC .......................................................... 717/104
See application file for complete search history.

(56) References Cited

U.S. PATENT DOCUMENTS

| | | | |
|---|---|---|---|
| 9,536,023 B2* | 1/2017 | Englehart | G06F 8/35 |
| 9,588,877 B1* | 3/2017 | Adir | G06F 11/3684 |
| 9,870,313 B2* | 1/2018 | Adir | G06Q 10/06395 |
| 10,275,227 B1* | 4/2019 | Vompolu | G06F 11/3688 |
| 10,387,585 B2* | 8/2019 | Manoj Gangadhar | G06F 11/36 |
| 10,423,390 B1* | 9/2019 | Mani | G06F 8/30 |
| 11,048,487 B1* | 6/2021 | Mestchian | G06F 8/72 |
| 2010/0325607 A1 | 12/2010 | Meijer et al. | |
| 2012/0167045 A1* | 6/2012 | Jeon | G06F 11/3664 717/121 |
| 2015/0067148 A1* | 3/2015 | Kim | H04L 67/12 709/224 |
| 2017/0262356 A1* | 9/2017 | Ramanathan | G06F 11/3608 |
| 2017/0351789 A1* | 12/2017 | Szpak | G06F 8/34 |
| 2018/0349103 A1* | 12/2018 | Brown | G06F 8/315 |
| 2019/0012257 A1* | 1/2019 | Indurthivenkata | G06F 8/35 |
| 2019/0163446 A1* | 5/2019 | Brunel | G06F 8/74 |
| 2019/0179727 A1* | 6/2019 | Bouissou | G06F 11/3604 |
| 2021/0382698 A1* | 12/2021 | Yu | G06F 8/447 |

OTHER PUBLICATIONS

Ruzica Piskac et al. "Proceedings of the 21st Conference on Formal Methods in Computer-Aided Design—FMCAD 2021"; Proceedings of the 21st Conference on Formal Methods in Computer-Aided Design—FMCAD 2021.*

ETAS "RTA-RTE V6.8.0 User Guide"; May 2019—ETAS GmbH, Stuttgart.*

Anonymous "Instructions scheduling—Wikipedia" Mar. 15, 2020, pp. 1-4, Retrieved from the Internet: https://en/wikipedia.org/w/index.php?title=Instruction_scheduling&oldid=945632462 [retrieved on Oct. 22, 2021].

Anonymous "Optimizing compiler—Wikipedia" Apr. 7, 2022, pp. 1-14, Retrieved from the Internet: https://en.wikipedia.org/w/index.php?title=Optimizing_compiler&oldid=949660274 [retrieved on Oct. 22, 2021].

European Search Report dated Nov. 3, 2021 for European Patent Application No. 21178528.2 for The MathWorks, Inc., 11 pages.

* cited by examiner

SYSTEMS AND METHODS FOR GENERATING SERVICE ACCESS POINTS FOR RTE SERVICES IN CODE OR OTHER RTE SERVICE INFORMATION FOR USE WITH THE CODE

CROSS-REFERENCE TO RELATED APPLICATIONS

The present application claims the benefit of U.S. Provisional Patent Application Ser. No. 63/036,473, which was filed on Jun. 9, 2020, by Biao Yu et al. for SYSTEMS AND METHODS FOR GENERATING SERVICE ACCESS POINTS FOR RTE SERVICES IN CODE OR OTHER RTE SERVICE INFORMATION FOR USE WITH THE CODE, which is hereby incorporated by reference.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
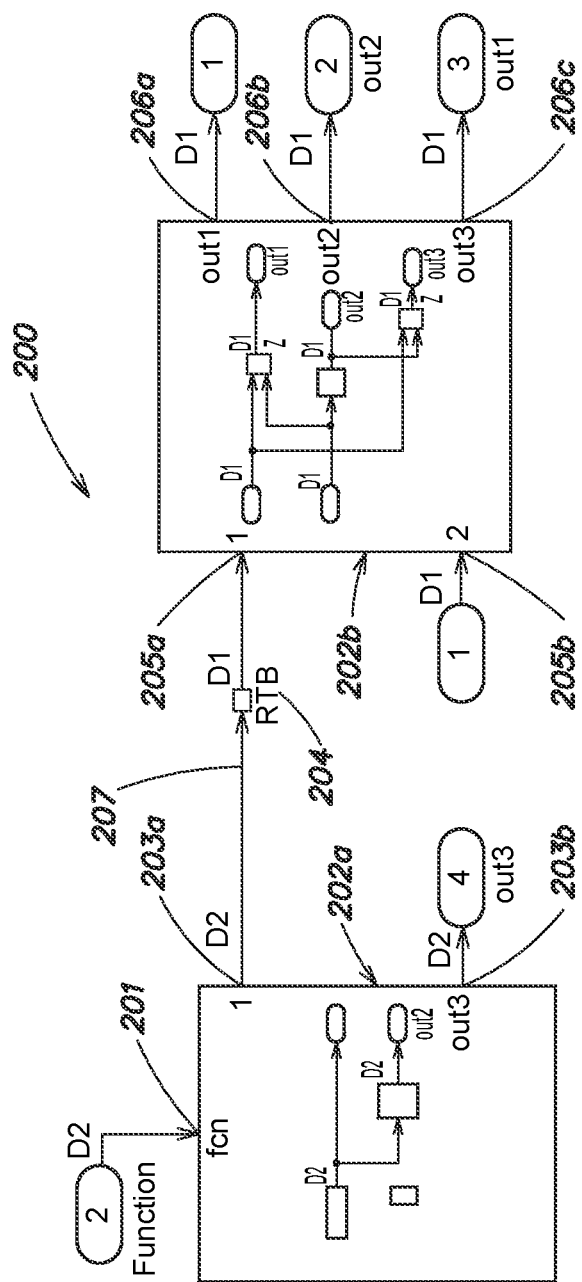
FIG. 1 is an illustration of a model that may be analyzed to identify a functionality that may need one or more RTE services and determine one or more model constraints according to one or more embodiments described herein.

Graphical modeling environments may be used by engineers to model or simulate real-world systems (dynamic systems). Such systems may include, but are not limited to, control systems, communications systems, factory automation systems, automotive systems, fluid systems, etc. For example, such automotive systems may include, but are not limited to, air-bag systems, event data recorders, anti-lock braking systems, cruise control systems, rain-sensing wipers, emission control systems, traction control systems, automatic parking systems, in-vehicle entertainment systems, back-up collision sensor systems, navigation systems, tire-pressure monitoring systems, electronic control units (ECU), etc. A user may create an executable graphical model by selecting desired model element types from a library browser, and placing instances of the selected model element types on a canvas. The canvas may be included in a graphical program editor. The model elements may be interconnected using connection elements that may establish data, control, mathematical, or other relationships among the connected model elements. In some embodiments, model elements may represent elemental dynamic systems and connection elements may represent signals. Relationships among model elements may also be established textually or in other ways. For example, a first model element may issue an event that triggers execution of a second model element without any connection element extending between the first and second model elements. The graphical modeling environment may also support the creation of state machine models. A state machine model may include states, junctions, and functions. Transitions may be created by connecting states together, connecting states and junctions together, etc.

The Simulink® model-based design environment from The MathWorks, Inc. of Natick, Mass., is an example of a graphical modeling environment. The Simulink® environment allows users to create a pictorial model of a dynamic system, specifically a block diagram. A model may include a plurality of symbols, called model elements or blocks. A block may have zero or more input ports, output ports, and states. A block may represent a dynamic system whose inputs, states, and outputs can change continuously and/or discretely at specific points in time during execution of the model. Lines may be used to connect the ports of blocks to one another, and may represent data or other dependencies between blocks. Signals may be represented as time-varying quantities that have values during model execution and may be shared between model elements. For example, a line connecting an output of a particular block to the input of a different block may indicate that the signal output of the different block depends on the signal output of the particular block during model execution.

The model elements or group of model elements (e.g., components or subsystems) may represent computational functionalities that may be part of one or more algorithms. As such, the model may be computational and may have executable semantics. In particular, the models may be simulated or executed. In particular, the models may provide one or more of time-based, event-based, state-based, message-based, frequency-based, control-flow based, and data-flow-based execution semantics. The execution of a model may simulate operation of the system that is being designed or evaluated.

A code generator may automatically generate code including algorithmic code that when executed, performs the computational functionalities of the model or model parts. As explained previously, the computational functionalities of the model can model or simulate one or more behaviors of the real-world system being modeled or simulated. The algorithmic code may be deployed on a device, e.g., a central processing unit (CPU), a microcontroller unit (MCU), a graphics processing unit (GPU), an Application Specific Integrated Circuit (ASIC), a Field Programmable Gate Array (FPGA), a Complex Programmable Logic Device (CPLD), a System on a Chip (SoC), etc., to control the target system.

To execute the algorithmic code and allow the target system to behave as designed, the algorithmic code, or different parts of the algorithmic code, may need to be scheduled. In addition or alternatively, certain services (e.g., data transfer, timer, communication, and diagnostics) may need to be handled by additional code or middleware not generated from the model. In some implementations, scheduling code or code for a runtime environment (RTE), e.g., RTE service code, is also deployed or implemented on the target system. Such code interacts with the algorithmic code generated from the model to, for example, control the behavior of the target system. With conventional systems the user may need to additionally schedule (produce scheduling code) the algorithmic code, with or without changes to the algorithmic code. The RTE specific scheduling implementation sometimes may need to be interwoven with the algorithmic code, rendering the algorithmic code unusable for different RTEs of different target systems. The scheduling may also be tedious, error-prone, non-intuitive, and/or inefficient for the user.

Alternatively, a user can specify the detailed RTE specific scheduling implementation at the model elements/components in the model by, for example, modifying the model to account for characteristics of the RTE, and code can be generated based on the modified model. For example, the RTE may have characteristics that are not accounted for or present in the modeling environment in which the model is simulated. Specifically, the modifications to the model may not affect the simulation of the model (e.g., the model and modified model may have the same simulation behavior in the modeling environment), but the modifications to the model may be needed such that when the code is generated and executes on the target, the RTE specifications are satisfied. As such, and according to conventional systems, the user may have to modify the model to account for characteristics of the RTE such that when the code is generated from the model and executes on the target, the code satisfies the characteristics of the RTE. Therefore, and according to conventional systems, the user is required to know the detailed characteristics of the RTE such that the model can be modified, for code generation, to account for the characteristics of the RTE. Further, if the RTE specifications change, the model may need to be modified further and different code is generated such that the different code satisfies the changed RTE specifications when the different code executes on the target. Modifying the model and generating code based on changes to, for example, the RTE specifications may be tedious, error-prone, non-intuitive, and/or inefficient for the user, and may also render the algorithmic code unusable for different RTEs of different target systems.

Briefly, the present disclosure relates to systems and methods for generating code from a model, where the code includes one or more service access points generated and at locations in the code based on an analysis of model constraints and deployment specifications (e.g., RTE specifications or operating system (OS) specifications, etc.). Specifically, a processor may analyze an executable model and identify a functionality that needs (e.g., requires) one or more RTE services implemented by an RTE executing on a target system. For example, different RTEs may include, but are not limited to, rate-monotonic scheduling (RMS) RTEs, concurrent RTEs, an Automotive Open System Architecture (AUTOSAR) RTE, a Portable Operating System Interface (POSIX) RTE, a custom RTE, etc. Each RTE may offer different types of RTE services. The RTE service offered by the RTE may include, but are not limited to, intra-process communication services, inter-process communication services, software services, and/or custom services.

The processor may also analyze the model to identify one or more model constraints on the RTE. In an embodiment, model constraints limit or constrain an aspect of the model that may affect timing, coherency, and/or latency of data associated with the model or part of the model. In an embodiment, model constraints affect the choice of RTE services implemented by the RTE. The process may receive one or more deployment specifications (e.g., RTE specifications and/or OS specifications) from a user, e.g., via a user interface, or from a stored specification, e.g., in memory. In an embodiment, the high-level deployment specifications may be RTE specifications and describe the operation (e.g., scheduling techniques utilized by the RTE, data sharing techniques utilized by the RTE, and/or intra-process communication techniques utilized by the RTE) of the RTE when executing RTE service code to implement RTE services on a target system that is a single application platform. In an embodiment, the high-level deployment specifications may be OS specifications that may describe the operation of the RTE when executing RTE service code to implement RTE services on a target system that is a multi-application platform.

The processor may generate, based on the analysis of the model constraints and the deployment specifications, one or more service access points that interface with the RTE to be provided on the target system. The analysis of the model constraints and the deployment specifications may determine which service access points are generated and where the service access points are located in the code.

The automatically generated code may be deployed and executed on the target system such that the deployed code satisfies the deployment specifications. The service access points may interface with the RTE and call the RTE service code, and when the deployed code and the RTE service code are executed on the target system, the target system may behave as modeled.

Advantageously, the generation of the service access points at locations in the code can provide separation of the model and RTE such that functionality design can be reused for different RTEs. This is because the two sources for the generation and location of the service access points are the model, e.g., model constraints, and deployment specifications, which are separate and distinct. Therefore, code can be regenerated for different RTEs having different specifications without modifying the model. Further, the model can be modified and the modified model can be reused with different RTEs based on the utilization of different RTE specifications. In addition, a user does not have to know or provide the detailed low-level deployment specifications, e.g., how an RTE service is implemented, and instead need only provide high-level deployment specifications, e.g., type of data sharing used by the RTE, such that the automatically generated code for the model is operable with the target system.

Alternatively or in addition to generating the code for the model, based on the model constraints and the deployment specifications, one or more admissible implementations of an RTE service may be determined. Specifically, an RTE service, e.g., explicit read for a data transfer RTE service, may be implemented by the RTE in a plurality of different ways based on the execution of RTE service code, e.g., disable/enable interrupt, data buffering, atomic read. In an embodiment, a processor may determine one or more admissible implementations of the plurality of different implementations based on the analysis of the model constraints and deployment specifications. The one or more admissible implementations may be provided as a suggestion to, for example, a user of the target system via a user interface of a processing device. If, based on the analysis, the processor determines that there are no admissible implementations, the user of the target system may be notified and the user may modify the model and/or one or more parameters/characteristics associated with the target system such that the target system may operate as desired. RTE service code may be automatically generated for an admissible implementation of the RTE service. The RTE may execute the generated RTE service code to implement the RTE service in accordance with the admissible implementation. Therefore, a user can provide only the high-level deployment specifications to determine which implementation, of a plurality of different implementations, is best suited for the RTE of the target, and thus does not need to know or provide the low-level specifications. As such, errors, e.g., utilizing an implementation of an RTE service that is inconsistent with the operation of the RTE, may be avoided. In addition, and by providing the one or more admissible implementations as a suggestion, the one or more embodiments described herein can provide an improvement in the field of designing and/or configuring target systems. Specifically, because the user of the target system is provided with the admissible implementations, the user may not have to determine which implementations are compatible/incompatible with the target system such that the target system operates in the desired manner. As such, according to the one or more embodiments described herein, less time and resources can be utilized during the design and configuration process of the target system. Additionally, the user does not have to be concerned with whether the generated code satisfies (i.e., meets, complies with, etc.) the deployment specifications, and the user is not required to modify the model such that the deployment specifications are satisfied when the code executes on the target system to behave as designed, which may be required by conventional systems. Instead, the one or more embodiments described herein automatically generate code for the admissible implementation that satisfies the deployment specifications when the code executes on the target system.

FIG. 1 is an illustration of a model 200 that may be analyzed to identify a functionality that may need one or more RTE services and determine one or more model constraints according to one or more embodiments described herein. The model 200 may represent a real-world system and when executed, may simulate a behavior of the system.

As depicted in FIG. 1, the executable model 200 includes write functionality block 202a and read functionality block 202b. The write functionality block 202a may check if the value at input port 201 is activated to determine whether a computation is to be performed. Based on an activation signal, the write functionality block may read a clock value and provide the clock value via output port 203a and through connection element 207 to read functionality block 202b. In addition, write functionality block 202a may output a value of a discrete integrator at output port 203b. The read functionality block 202b may receive the clock value from the write functionality block 202a at input port 205a. The read functionality block 202b may output, at output port 206b, a value of a sine wave function utilized with an input value received at input port 205b. The read functionality block may subtract the output value of the sine wave function from the received clock value and provide an output of the subtraction at output port 206a. The read functionality block may subtract the input value at input port 205b from the received clock value and provide output at output port 206c.

In this example, write functionality block 202a and read functionality block 202b may operate at different rates. For example, write functionality block 202a may operate at a slower rate than the read functionality block 202b—meaning that during an execution/simulation period, the read functionality block 202b may consume more output values than produced by the write functionality block 202a. For example, the read functionality block 202b may consume output values at a rate of every 1 ms and the write functionality block may produce output values at a rate of every 10 ms. Therefore, there may be a slow-to-fast transition between the write functionality block 202a and read functionality block 202b in model 200. The model 200 may include a rate transition block (RTB) 204, between the write functionality block 202a and the read functionality block 202b, that may transfer the clock value written (e.g., produced) by the write functionality block 202a to the read functionality block 202b that reads (e.g., consumes) and uses the clock value.

In the example shown in FIG. 1, a model analyzer may analyze the model 200 and identify the RTB 204, between the write functionality block 202a and the read functionality block 202b operating at different rates, as a functionality of the model 200 that may need the data transfer RTE service. For example, a data structure, e.g., a table, may store an association between a functionality of a model and one or more RTE services that may be needed by the functionality of the model. The model analyzer may utilize the data structure to identify one or more functionalities in a model that may need one or more RTE services. The following table includes a list of example functionalities of a model and one or more RTE services that may be needed by the functionalities.

| Functionality of Model | RTE Service |
|---|---|
| Rate transition block | Data transfer |
| Sine wave | Timer |
| Integrator | Elapsed Time |
| Error status (e.g., signal invalid) | Diagnostic |
| Output port | Sender services, or digital to analog (D2A) device driver |
| Input port | Receiver services, or analog to digital (A2D) device driver |
| Parameter | Parameter services. |

In this example, and based on the data structure, the model analyzer may identify the RTB 204 of the model 200 as needing the data transfer RTE service, when code for the model is deployed on a target system, to transfer the clock value. Although table 1 includes particular functionalities that may need particular RTE services, it is expressly contemplated that the functionalities in table 1 may need additional and/or different RTE services. In addition, it is expressly contemplated that different functionalities not included in table 1 may need one or more RTE services. Accordingly, it should be understood that the functionalities and RTE services included in table 1 are for exemplary purposes only.

The model analyzer may analyze the model to determine one or more model constraints on the RTE. In an embodiment, model constraints can affect timing, coherency, and/or latency of data associated with the model. The model analyzer may analyze a mathematical representation of the model having model parameters (e.g., parameters based on components, blocks, connections, values, etc. of the model) to determine the one or more model constraints on the RTE. Based on the analysis, the model analyzer can determine how the model parameters affect timing, coherency, and/or latency. For example, Simulink® Design Optization™, from The MathWorks, Inc., may provide functions, interactive tools, and/or blocks for analyzing model parameters to determine model constraints that may affect timing, coherency, and/or latency. In addition, any of a variety of different software applications, tools, algorithms, and/or techniques may be utilized to analyze a model to determine model constraints that affect timing, coherency, and/or latency.

In an embodiment, model constraints affect the choice of RTE services implemented by the RTE. For example, if a value read is for triggering an alarm, that value may need to be read out immediately and thus latency in handling the value is important. As such, the data transfer RTE service implemented by the RTE needs to meet this criterion. Thus, latency is a factor in determining which service access points are generated and where the service access points are located in the code when the code is generated for the model. However, in other circumstances (e.g., reading a temperature), the value to be read or written may be utilized where latency in handling the value is not important. As such, latency not being a factor is utilized in determining which service access points are generated and where the service access points are located in the code when the code is generated for the model.

As another example, if multiple readers in the model use a value and feed the value to a same computation or block, for example, the coherency of the value across the multiple readers needs to be maintained and thus data coherency is a concern. Conversely, if the model does not include multiple readers, then data coherency may not be a concern.

The structure of model 200 is provided for simplicity and ease of understanding. However, it is expressly contemplated that more complex models, e.g., with numerous blocks, different types of blocks, connector elements, and/or hierarchies, may be analyzed to identify one or more functionalities in a model that may need one or more RTE services and determine one or more model constraints according to one or more embodiments described herein. For example, a first portion of a model (e.g., a first hierarchical level) may require one or more RTE services while a second portion of the model (e.g., a second hierarchical level) may require one or more different RTE services.

Figure 2:
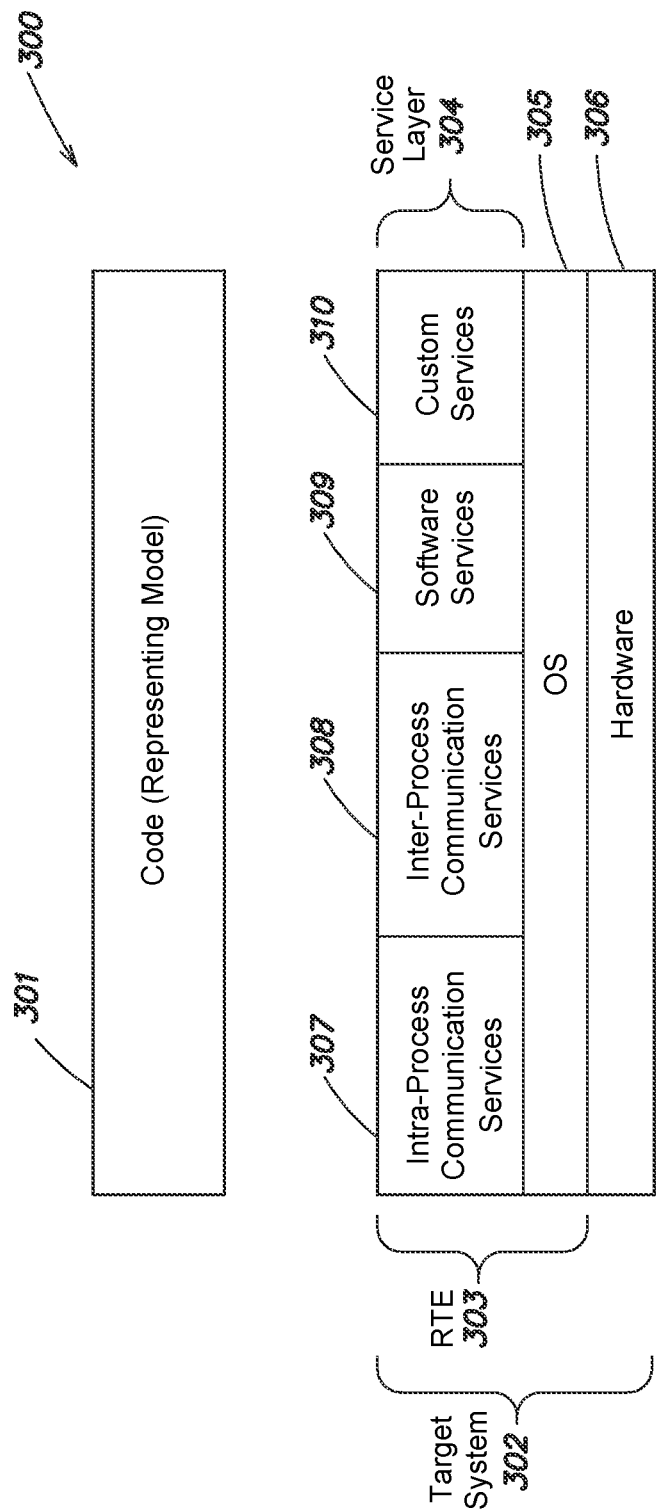
FIG. 2 is an illustration of an example abstracted layer view of code that may be deployed on a target system with an RTE according to one or more embodiments described herein.

FIG. 2 is an illustration of an example abstracted layer view 300 including generated code 301 that may be deployed on a target system 302. The target system 302 may include RTE 303 and hardware layer 306. For example, exemplarily RTEs may include, but are not limited to, RMS RTEs, concurrent RTEs, an AUTOSAR RTE, a POSIX RTE, custom RTEs, etc. In an implementation, the target system 302 may be a single application platform or a multi-application platform.

The hardware layer 306 may represent the physical resources (not shown), e.g., processors, memory (e.g., random-access memory (RAM)), I/O, etc., utilized to execute tasks on the target system 302. The RTE 303 may include service layer 304 and operating system OS 305. In an implementation, the OS 305 may be a real-time operating system (RTOS). The service layer 304 of the RTE 303 may allow the code 301 to communicate with the RTE 303 and call RTE service code (not shown) such that the OS 305 may execute the RTE service code to implement one or more RTE services during execution of the code 301 deployed on target system 302. Although FIG. 2 depicts the RTE including an OS 305, it is expressly contemplated that the RTE 303 may not include the OS 305 and, may instead, for example, include one or more schedulers (not shown).

The service layer 304 of the RTE 303 may contain one or more different categories of RTE services that may be implemented by the RTE 303. For example, the RTE services may include intra-process communication services 307 that handles the intra-process communication services that are needed by code 301, inter-process communication services 308 that handles the intra-process communication services that are needed by the code 301, software services 309 that handles the software services that are needed by the code 301, and custom services 310 that handles the custom services that are needed by the code 301. Intra-process communication services 307 may be communication services associated with a communication within a single process. Inter-process communication services may be communication services associated with a communication between different processes. Communication services may include, but are not limited to, data transfer, pipeline, message queue, shared memory, sockets, etc. The communication services may be intra-process communication services and/or inter-process communication services based on the type of communication. Software services may include, but are not limited to, diagnostic, calibration, persistent memory, time, measurement, etc. Custom services 310 may be other services that are provided by a user of the target system 302.

The order of the layers, e.g., code 301, RTE service layer 304, OS 305, hardware layer 306, from top to bottom in FIG. 2 may represent a communication order, and does not represent, for example, a physical order of the layers. For example, although the code 301 is shown as being a "top" layer in FIG. 2, it should be understood that code 301 may be stored in the memory or other storage of the hardware layer 306.

Referring back to the model 200 of FIG. 1, the RTB 204 is identified as needing the data transfer RTE service that can be an intra-process communication service 307. As such, and when the code 301 for model 200 is deployed on target system 302, the code 301 needs the data transfer RTE service to operate in the desired manner, e.g., to transfer the clock value written by a portion of the code 301 that represents the write functionality block 202a to a portion of the code 301 that represents the read functionality block 202b and reads and uses the clock value.

In addition to the model, e.g., model 200 of FIG. 1, generating code that includes service access points to RTE services or information about RTE services, e.g., admissible implementation, suitable for use with the model can be dependent on deployment specifications (e.g., RTE specifications or OS specifications) in which a high-level description of the RTE 303 to be used is provided. In particular, the high-level specifications may describe the operation (e.g., scheduling techniques utilized by the RTE, data sharing techniques utilized by the RTE, and/or intra-process communication techniques utilized by the RTE) of the RTE when executing RTE service code to implement RTE services. The deployment specifications need not include a low-level description that may describe how an RTE service needed by the code 301 is implemented. For example, the high-level deployment specifications may indicate a type of data sharing, e.g., explicit read, utilized by the RTE 303 during execution of the code 301 on target system 302. The low-level specifications, which need not be included in the deployment specifications that are utilized for generating the service access points, may indicate how the needed data transfer RTE service is implemented, e.g., enable/disable interrupt, data buffering, or atomic read.

Figure 3A:
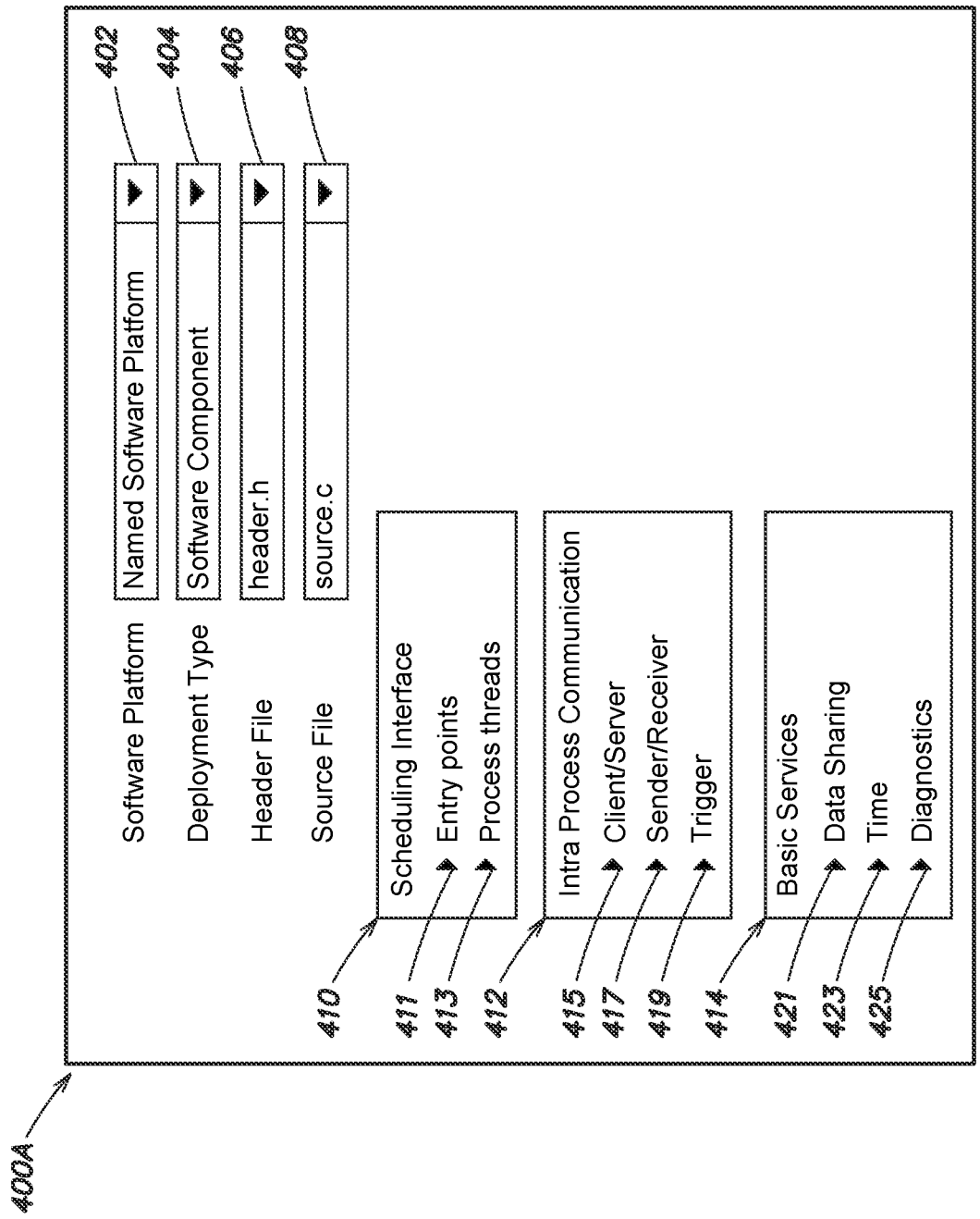
FIG. 3A is an illustration of an example interface utilized for receiving RTE specifications according to one or more embodiments described herein.

FIG. 3A is an illustration of an example interface utilized for receiving RTE specifications according to one or more embodiments described herein. Graphical user interface (GUI) 400A may include a plurality of fields that may be selectable and/or editable by a user utilizing one or more input devices associated with or in communication with a processing device. In the example of FIG. 3A, the GUI 400A may be based on a target system 302 being a single application platform as will be described in further detail below.

GUI 400A may include a software platform field 402 that may allow the user to select, from a drop-down list, a software platform, of a target system 302, on which the code 301 is to be deployed. Because the software platform may be any of a variety of different existing software platforms or a customized software platform, the software platform field 402 in the example of FIG. 3A indicates "Named Software Platform" to signify that the software platform field 402 may store a name of any software platform. For example, such existing software platforms that may be named/indicated in software platform field 402 may include, but are not limited to, classic AUTOSAR, Association for Standardization of Automation and Measuring Systems (ASA) MDX, Open Systems and their interfaces for the Electronics in Motor Vehicles (OSEK), Vehicle Distributed eXecutive (VDX), etc. As such, the target system 302 of this example may include a Named Software Platform with an RTE.

In addition, GUI 400A may include a deployment type field 404 that may allow the user to select, from a drop-down list, the type of deployment of the code 301 on the target system 302. In this example, the deployment type that is selected in deployment type field 404 is "software component" that may indicate that the code 301 is to be deployed on the target system 302 with a software platform that is a single application platform. Other example deployment types may include, but are not limited to, software application (e.g., deployment of an executable on the target system 302 that is a multi-application platform), software sub-assembly (e.g., deployment of sub-component functionalities), software utility (e.g., deployment of library), etc. The deployment type may dictate, for example, what type of deployment specifications a user may provide via GUI 400A. For example, different types of deployment specifications may be provided by the user via GUI 400A based on a different deployment type indicated by the user in deployment type field 404. In this example and based on the selection of "software component" from deployment type field 404, GUI 400A may include additional information such that the user can provide RTE specifications associated with a target system 302 that includes a software platform that is a single application platform.

GUI 400A may further include a header file field 406 and a source file field 408 that may allow the user to respectively select, from drop-down lists, the header file and the source file associated with RTE service code that may implement one or more RTE services. The header file field 406 may indicate the name of the header file that stores the names of the functions that may implement one or more RTE services. The source file field 408 may indicate the name of the source file that stores, for example, the code (e.g., RTE service code) of the functions that implement the one or more RTE services.

It is expressly contemplated that one or more of the drop-down lists of fields 402, 404, 406, and 408 may be auto-populated based on a selection in a different drop-down list or entry, e.g., 406 may be auto-populated based on the selection made for field 404. In addition, although fields 402, 404, 406, and 408 are shown as drop-down lists, it is expressly contemplated that fields 402, 404, 406, and 408 may include command lines that allow a user to directly enter text to populate the fields, or any other type of selection affordance (e.g., radio buttons, check buttons, list box, etc.) that allows the user to populate a field.

Additional information, such as scheduling interface section 410, intra process communication section 412, and basic services section 414, may be provided to the user via GUI 400A. Sections 410, 412, and 414 may allow the user to provide RTE specifications that describe, at a high-level, the operation of the RTE 303 for the target system 302 that includes a software platform that is a single application platform. Had a different software platform and/or deployment type been selected or entered in software platform field 402 and/or deployment type field 404, different and/or additional information may be provided to the user that allows the user to provide deployment specifications that describe the operation of the RTE 303 of the different software platform and/or different deployment type. Thus, different RTEs and/or deployment types may have different associated types of deployment specifications that the user can define according to the one or more embodiments described herein and utilizing GUI 400A. The RTE specifications may be used, as described in further detail below, to generate service access points that are at locations in the code 301.

Users may respectively use sections 410, 412, and 414 to describe the scheduling techniques utilized by the RTE when RTE service code executes, the intra process communication techniques utilized by the RTE when RTE service code executes, and the basic services utilized by the RTE when RTE service code executes. Specifically, and based on a selection of one or more fields in sections 410, 412, and/or 414 one or more different RTE specifications may be provided, e.g., displayed, to the user via GUI 400A such that the user can further define the RTE specifications.

Although shown on the same interface 400A, the fields, e.g., 402, 404, 406, 408, 410, 412, 414 etc., may be on separate and distinct interfaces. In addition, it should be appreciated that a user need not describe all the RTE specifications in relation to scheduling interface section 410, intra process communication section 412, and/or basic services section 421. Instead, the user may, for example, only provide a portion of the RTE specifications to generate one or more service access points in code 301, e.g., the user only provides data sharing specifications in field 421, according to one or more embodiments described herein.

The user may select or enter entry-points entry 411 from scheduling interface section 410 to define the entry-points in the code 103 where the RTE 303 may start execution. For example, an entry point may be an interrupt service routine in the code 301. In addition, the user may select process threads entry 413 from scheduling interface section 410 to describe thread processing utilized by the RTE 303. Based on the selection of process threads entry 413, the scheduling interface section 410 may display a selectable list of thread processing specifications (not shown) of the RTE 303. For example, the thread process specifications may include, but are not limited to, that the RTE 303 utilizes a multi-core processor of the target system 302, that the RTE 303 utilizes a single-core processor of the target system 302, the RTE 303 utilizes RMS for task execution, the RTE 303 utilizes round-robin scheduling for task execution, etc. In an embodiment, a process may comprise multiple threads of execution and a thread of execution may encapsulate a task.

GUI 400A may include an intra-process communication section 412 that allows the user to describe the one or more types of intra-process communications utilized by the RTE 303. For example, if the RTE 303 utilizes a client/server intra-process communication technique (data from a "server" defined in the code 301 (e.g., function call) is only available to "client" defined in code 301 that requested data), the user may select or enter client/server entry 415. Based on the selection or entry of client/server entry 415, the intra-process communication section 412 may display a selectable list of client/server specifications (not shown) that describe the client/server intra-process communication utilized by the RTE 303.

If the RTE 303 utilizes a sender/receiver intra-process communication ("sender" in code (e.g., function call) may broadcast data and any "receiver" defined in code is free to read data from RTE 303), the user may select or enter sender/receiver entry 417. Based on the selection or entry of sender/receiver entry 417, the intra-process communication section 412 may display a selectable list of sender/receiver specifications (not shown) that describe the sender/receiver intra-process communication utilized by the RTE 303. Such sender/receiver intra-process communication specifications may include, but are not limited to, queue utilization or no queue utilization, queue length, queue policies (e.g., overflow), etc.

If the RTE utilizes a trigger intra-process communication (e.g., execution of a portion in code 301 may trigger an execution of other portion in code 301), the user may select or enter trigger entry 419. Based on the selection or entry of trigger entry 419, the intra-process communication section 412 may display a selectable list of trigger specifications (not shown) that describe the trigger intra-process communication utilized by the RTE 303. For example, such trigger specifications may include, but are not limited to, timer trigger, event trigger, data trigger, etc.

GUI 400A may also include basic services section 414 that allows the user to describe the basic services that may be utilized by the RTE 303. For example, the user may describe the type of data sharing utilized by the RTE 303 by selecting or entering data sharing entry 421. Based on the selection of data sharing entry 421, the basic services section 414 may display a selectable list of data sharing specifications (not shown) that describe the data sharing utilized by the RTE 303. For example, such data sharing specifications may include, but are not limited to, explicit data sharing (where RTE 303 provides the newest available data and does not account for coherency, e.g., explicit read and explicit write), implicit data sharing (where RTE 303 ensures coherent data across portion of code 301 during task execution, e.g., implicit read and implicit write), shared memory (no expectation on data coherency within or across portions of code 301), etc.

The user may describe the specifications associated with a timer of the RTE 303 by selecting or entering time entry 423. Based on the selection or entry of time entry 423, the basic services section 414 may display a selectable list of time specifications (not shown) that are associated with the timer of the RTE 303. For example, the time specifications may include, but are not limited to, absolute time, elapsed time, size of timer, resolution of timer, etc. In addition, the user may describe the diagnostic specifications that describe the diagnostic functionalities that the RTE 303 may utilize by selecting or entering diagnostics entry 425. Based on the selection or entry of diagnostics entry 425, the basic service section 414 may display a selectable list of diagnostic specifications (not shown) that describe actions/steps taken by the RTE 303 in the event of an error, fault, failure, etc. For example, the diagnostic specifications may include, but are not limited to, warning/error message transmittal, halting processes, etc.

Figure 3B:
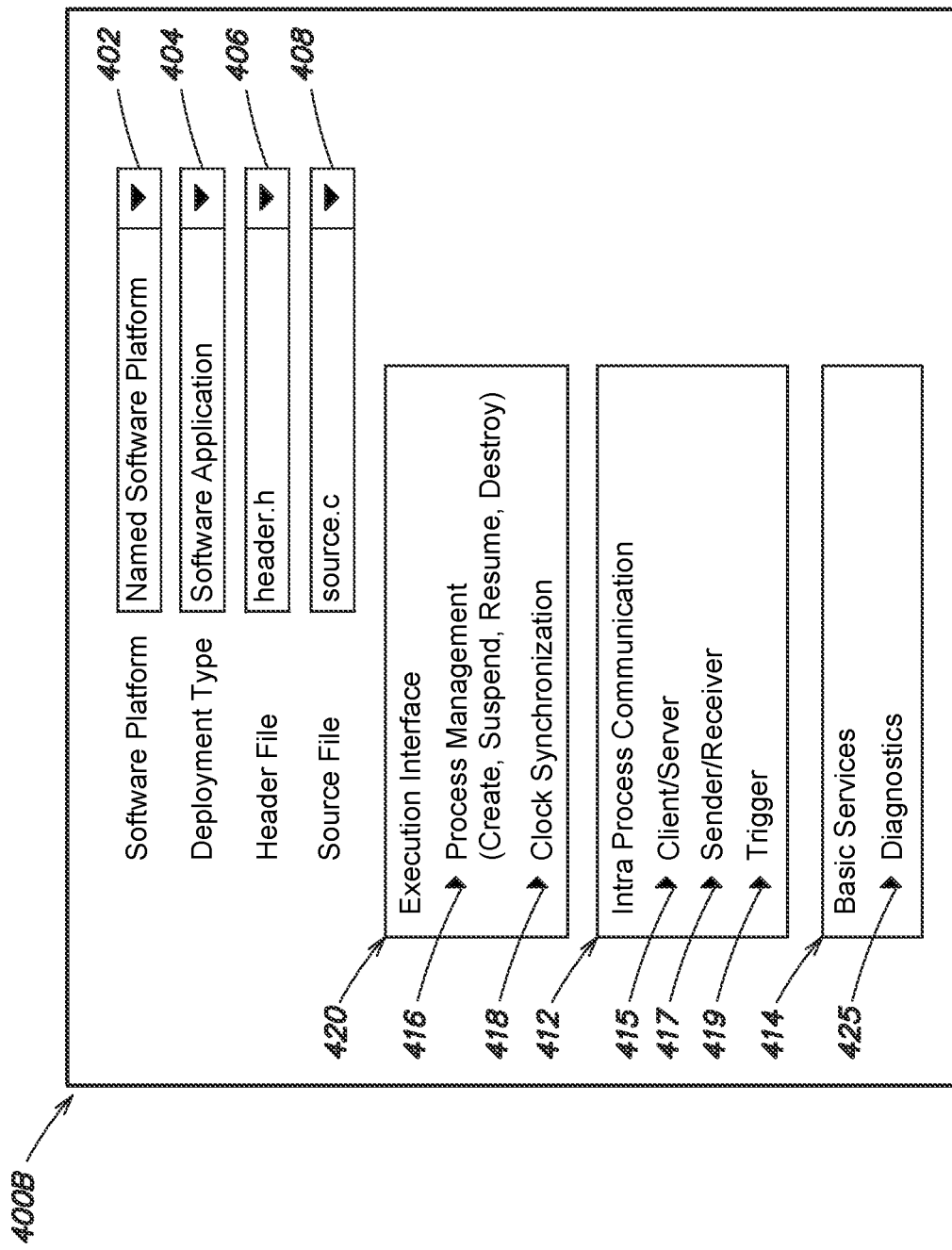
FIG. 3B is an illustration of another example interface utilized for receiving OS specifications according to one or more embodiments described herein.

FIG. 3B is an illustration of another example interface utilized for receiving OS specifications according to one or more embodiments described herein. In an embodiment, the high-level OS specifications may describe the operation of the RTE when executing RTE service code to implement RTE services on a target system 302 that is a multi-application platform. For GUI 400B of FIG. 3B, the deployment type that is selected from deployment type field 404 is "software application" that may indicate that the code 301 is to be deployed on a target system 302 that includes a software platform that is a multi-application platform. Accordingly, information may be provided to the user that allows the user to provide OS specifications that describe the operation of a "Named Software Platform", as indicated in field 403, that is a multi-application platform. For example, such existing software platforms that may be named/indicated in software platform field 402 may include, but are not limited to, adaptive AUTOSAR, Linux® operating system, QNX platform, etc.

GUI 400B of FIG. 3B may include fields (e.g., 402, 404, 406, and 408) that are the same as the fields included in GUI 400A of FIG. 3A. Additionally, GUI 400B may include sections (e.g., 412 and 414) that are the same as the sections included in GUI 400A of FIG. 3A. In alternative embodiments, the sections (e.g., 412 and 414) of GUI 400B may be different than the sections of GUI 400A of FIG. 3A.

Because "software application" is selected or entered in deployment type field 404, sections 420, 412, and 414 may include additional information that allows users to provide OS specifications that describe, at a high-level, the operation of the RTE for a target system 302 that includes a software platform that is a multi-application platform.

Specifically, execution interface section 420 may include a process management entry 416. The user may select or enter the process management entry 416 from the execution interface section 420. Based on the user selection, the user may be able to describe the process management techniques (e.g., create, suspend, resume, and destroy a process) utilized by the RTE when RTE service code executes. Additionally, the user may select or enter clock synchronization entry 418 from execution interface 420 to synchronize a clock of the target system 302 that includes a software platform that is a multi-application platform. Based on the user selection, the user may be able to describe the clock synchronization techniques utilized by the RTE when RTE service code executes. For example, such clock synchronization techniques (e.g., algorithms) may include, but are not limited to, Berkeley algorithm, Lamport timestamp, etc.

Similar to GUI 400A of FIG. 3A, GUI 400B of FIG. 3B may also include an intra-process communication section 412 that allows the user to describe the one or more types of intra-process communications utilized by the software platform. Additionally, and similar to GUI 400A of FIG. 3A, GUI 400B of FIG. 3B may also include a basic services section 414 that includes diagnostic entry 425. However, basic services section 414 of FIG. 3B does not include data sharing entry 421 and time entry 423 that are included in GUI 400A of FIG. 3A because such services may not be exposed as interfaces to a target system 302 that is a multi-application platform. Instead, such services, e.g., data sharing and time services, may be implemented as internal behavior of an application of the software platform that is a multi-application platform.

Therefore, and according to the one or more embodiments described herein, different interfaces (e.g., GUI 400A and GUI 400B) may allow the user to provide/define different deployment specifications (e.g., RTE specifications and OS specifications) based on different characteristics of the target system 302, e.g., whether the target system 302 is a single application platform or a multi-application platform. The RTE specifications described with reference to FIG. 3A and the OS specifications as described with reference to FIG. 3B are to be taken for illustrative purposes only, and it is expressly contemplated that additional or different RTE specifications and/or OS specifications may be utilized in accordance with one or more embodiments described herein. In addition, although the user interfaces in FIGS. 3A and 3B are GUIs, it is expressly contemplated that a user may provide the deployment specifications via a command line or other type of interface to define the deployment specifications. Furthermore, it is expressly contemplated that the deployment specifications may be provided and stored in a data structure, e.g., file, instead of being received via GUIs 400A and 400B from a user. As such, the data structure may be provided to the code generator, and the code generator may utilize the deployment specifications in the data structure to generate the service access points in the code 301 according to the one or more embodiments described herein.

Accordingly, the user need only provide, via GUIs 400A and/or 400B, deployment specifications (e.g., RTE Specifications and OS Specifications) describing the operation of the RTE 303 at a high-level instead of providing low-level specifications that may, for example, describe how an RTE service is implemented by the RTE 303. For example, the user may utilize the GUI 400A to indicate for the RTE specifications that the RTE 303 utilizes an explicit read for data sharing such that the one or more embodiments described herein generate the service access points at determined locations in the code 301. However, the user need not provide the low-level specifications that may indicate how the explicit read is to be implemented, e.g., enable/disable interrupt, data buffering, or atomic read.

Figure 4A:
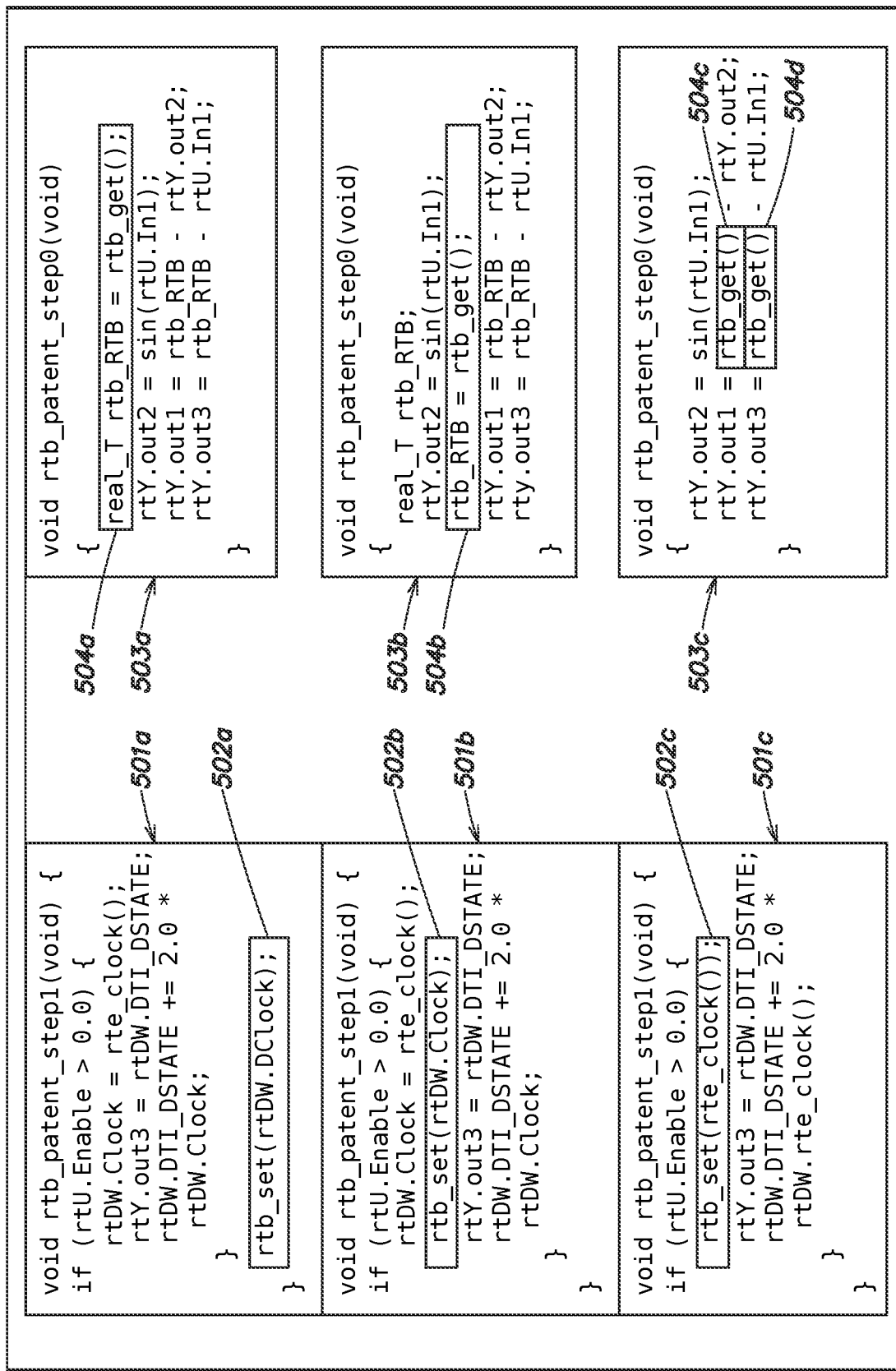
FIG. 4A is an illustration of different example code with service access points that may be generated for the model of FIG. 1, where the generated code may be based on the model, model constraints, and deployment specifications according to one or more embodiments described herein.

FIG. 4A is an illustration of different example code with service access points that may be generated for the model 200 of FIG. 1, where the generated code may be based on the model, model constraints, and deployment specifications according to one or more embodiments described herein.

The generated code 301 for model 200 may include one of the alternative write functions (501a, 501b, or 501c) that may be generated for write functionality block 202a and one of the alternative read functions (503a, 503b, or 503c) that may be generated for read functionality block 202b. The determination of which of the alternative write functions 501a-c and which one of the alternative read functions 503a-c are generated may be based on model 200, model constraints on the RTE derived from analyses of the model 200, and the RTE specifications, e.g., provided by the user through GUIs 400A of FIG. 3A.

In this example, let it be assumed that the user utilizes data sharing entry 421 of the GUI 400A to indicate the type of data sharing utilized by the RTE. For example, the user may indicate via GUI 400A that the RTE utilizes explicit write or implicit write. In addition, the user may indicate via GUI 400A that the RTE utilizes explicit read or implicit read.

In this example, due to the simplicity of model 200, model 200 may not have explicit model constraints on the RTE. Accordingly, in an embodiment, the set of write codes 501a-c and the set of read codes 503-c can be generated and offered for user choice. However, the model 200 can be a portion included or used by another model, from which model constraints can be derived. As explained previously, model constraints may, for example, affect timing, coherency, and/or latency of data associated with the model. One model constraint can be the use of the clock value to trigger an alarm, where latency is important. Another model constraint can be the use of the clock value for reading a temperature, where latency is not important.

Thus, different combinations of the alternative write functions 501a-c and read functions 503a-c (e.g., nine different combinations) may be generated based on (1) model 200, (2) model constraints where latency is or is not a factor, and (3) the RTE specifications that may indicate the type of data sharing (e.g., explicit write or implicit write and explicit read or implicit read).

In an embodiment, deployment constraints may also be utilized, in addition to the model constraints and deployment specifications, to generate the service access points and determine their location in the code 301. For example, if the target system 302 has a constraint on memory (a deployment constraint), e.g., free memory is low, the service access points and their location in the code may be determined, in addition to being determined based on the model constraints and deployment specifications, such that less memory is utilized when the RTE service is implemented.

Referring to FIG. 4A, write functions 501a, 501b, and 501c respectively include service access points 502a, 502b, and 502c at different locations within the code 501a-501c, respectively. The service access points 502a, e.g., "rtb_set (rtDW.DClock);", 502b, e.g., "rtb_set (rtDW.Clock);", and 502c, e.g., "rtb_set (rte_clock( ));", write out a clock value from the respective write functions to the RTE 303 so that it may be used by another functionality. Write function 501a, that includes service access point 502a at the end of the write function 501a as depicted in FIG. 4A, reads a clock value at code line 3 and writes the clock value to the RTE 303 at the end of the write function 501. Write function 501b, that includes service access point 502b at the location in write function 501b as depicted in FIG. 4A, reads a clock value at code line 3 and writes the clock value to the RTE 303 at the next line, code line 4. Write function 501c, that includes service access point 502c at the location in write function 501c as depicted in FIG. 4A, directly writes out a clock value at code line 3, without latch, e.g., without storing the clock value in the function.

As such, the execution of write function 501a with service access point 502a at the location as depicted in FIG. 4A has the most delay of the three write functions because after the clock value is read at code line 3, other computational operations are conducted, at lines 4 to 6, before the clock value is written out. In addition, function 501*a* keeps consistency in the function since the same clock value is used throughout function 501*a*. The execution of the write function 501*b* with the service access point 502*b* at the location as depicted in FIG. 4A has minimum latency of the three write functions because the clock value is written at code line 4 after it is read at line 3, and keeps consistency in the function since the same clock value is used throughout the function 501*b*. The execution of write function 501*c* with service access point 502*c* at the location as depicted in FIG. 4A provides the newest available data of the three write functions since the clock value is written at code line 3, and has no consistency in the function since, for example, the clock value written at line 3 is different from the clock value read and used at line 6 of the function 501*c*.

Thus, if the RTE specifications provided via GUI 400A indicate implicit write and latency is or is not a factor, the code generator may generate write function 501*c* of the three alternative write functions since the RTE ensures coherent data. If the RTE specifications provided via GUI 400A indicate explicit write and the model constraints indicate latency is a concern, the code generator may generate write function 501*b* of the three alternative write functions since the clock value is written at code line 4 and the RTE does not ensure coherent data. If the RTE specifications provided via GUI 400A indicate explicit write and latency is not a concern, the code generator may generate write function 501*a* of the three alternative functions since the clock value is written at the end of the function 501*a* and the RTE does not ensure coherent data.

Figure 4B:
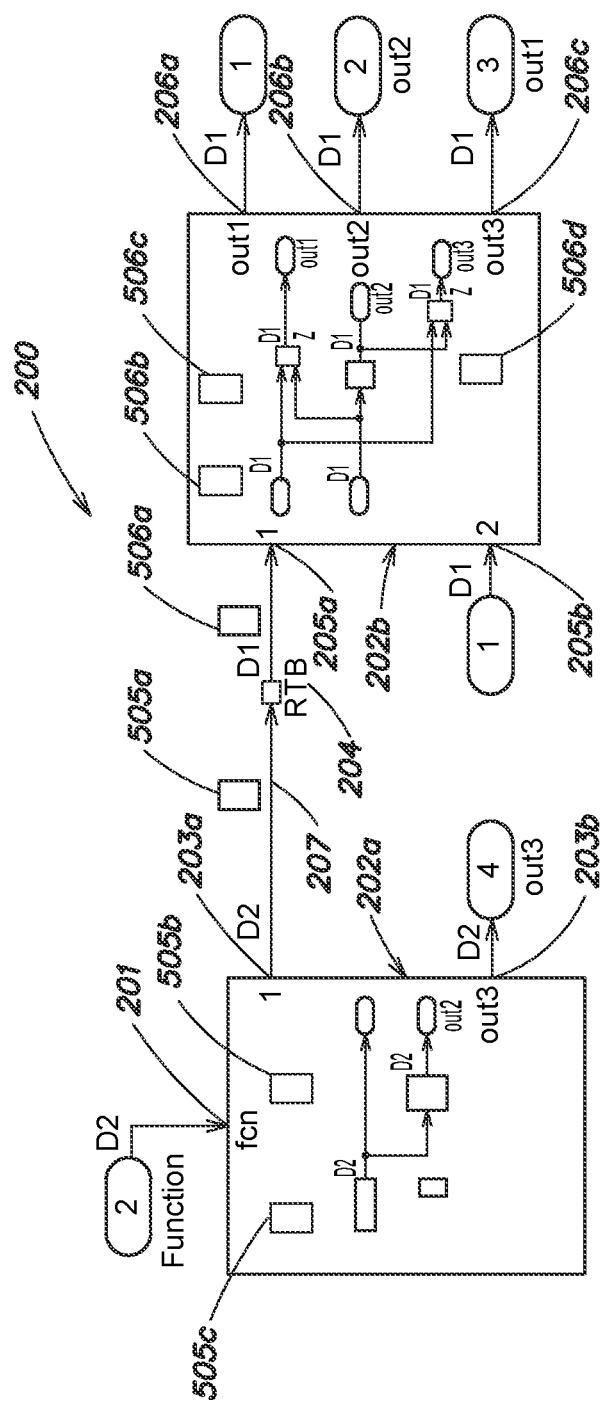
FIG. 4B is an illustration of an example of the model of FIG. 1 that includes particular locations that correspond to the service access points of generated code of FIG. 4A according to one or more embodiments described herein.

FIG. 4B is an illustration of an example of model 200 of FIG. 1 that includes illustrative locations in the model 200 that correspond to the service access points of the functions of FIG. 4A according to one or more embodiments described herein. Locations 505*a*, 505*b*, and 505*c* in model 200 of FIG. 4B may respectively correspond to the service access points of the three write functions 501*a*, 501*b*, and 501*c*, and may indicate when the clock value is written by the write functions during execution of the code 301. Specifically, location 505*a* may correspond to the service access point 502*a* of the write function 501*a* that writes the clock value at the end of the function. Location 505*b* may correspond to service access point 502*b* of write function 501*b* that writes out the clock value at code line 4. Location 505*c* may correspond to service access point 502*c* of write function 501*c* that directly writes out the clock value at code line 3, without latch.

Referring back to FIG. 4A, read functions 503*a*, 503*b*, and 503*c* respectively include service access points 504*a*, 504*b*, and 504*c*/504*d* at different locations. Service access points 504*a*, e.g., "real_T rtb_RTB=rtb_get( );", 504*b*, e.g., "rtb_RTB=rtb_get( );", 504*c*, e.g., "rtb_get( )", and 504*d*, e.g., "rtb_get( )", read a clock value from other functions, e.g., a write function of the three alternative write functions, via RTE services. Read function 503*a*, that includes service access point 504*a* at code line 2 of the read function 503*a* as depicted in FIG. 4A, reads the clock at the beginning of the read function 503*a* and then the clock value is used at code lines 4 and 5, and keeps consistency in the function since the same clock value is utilized throughout the function 503*a*. Read function 503*b*, that includes service access point 504*b* at the location in read function 503*b* as depicted in FIG. 4A, reads the clock at code line 4, and then the clock value is used computationally at code lines 5 and 6. Read function 503*b* keeps consistency in the function since the same clock value is utilized throughout the function 503*b*. Read function 503*c*, that includes service access points 504*c* and 504*d* at the locations in read function 503*c* as depicted in FIG. 4A, reads the clock value every time the clock value is used, e.g., at code lines 3 and 4, and there is no consistency in the function since two different clock values may be read at code lines 3 and 4.

Thus, if the RTE specifications provided via GUI 400A indicate implicit read and latency is or is not a concern, the code generator may generate read function 503*c* of the three alternative read functions since the RTE ensures coherent data. If the RTE specifications provided via GUI 400A indicate explicit read and the model constraints indicate latency is a concern, the code generator may generate read function 503*b* of the three alternative write functions since coherency needs to be accounted for and the clock value is read at line 4 and utilized at lines 5 and 6. If the RTE specifications provided via GUI 400A indicate explicit read and latency is not a concern, the code generator may generate write function 503*a* of the three alternative functions since coherency needs to be accounted for and the clock value is read at line 2 and utilized at lines 4 and 5.

Referring to FIG. 4B, locations 506*a*, 506*b*, and 506*c*/506*d* may respectively correspond to the service access pointes of the three read functions 503*a*, 503*b*, and 503*c*, and may indicate when the clock value is read by the read functions during execution of the code 301. Location 506*a* may correspond to the service access point 504*a* of the read function 503*a* that reads the clock at the beginning of the read function 503*a* at code line 3. Location 506*b* may correspond to the service access point 504*b* of the read function 503*b* that reads the clock value at code line 4. Locations 506*c* and 506*d* may respectively correspond to service access points 504*c* and 504*d* of the read function 503*c* that read the clock value every time the value is used, e.g., line codes 3 and 4.

In an embodiment, the locations 505*a-c* and 506*a-d* in model 200 may not be shown and may be excluded from the model 200. Alternatively, the locations 505*a-c* and 506*a-d* may be auto-generated with the alternative codes 501*a-c* and 503*a-c* for user view such that the user may understand the relationship between the service access points in the code and the corresponding locations in the model 200. In addition, although the code 301 in the example of FIG. 4A includes functions, it is expressly contemplated that the code 301 need not include functions, and the code 301 without functions may operate according to the one or more embodiments described herein. Further, although the example of FIGS. 4A and 4B include service access points for a single RTE service, e.g., data transfer RTE service, it is expressly contemplated that other service access points may, for example, be generated for other RTE services. As such, the service access points generated for each RTE service may, for example, be grouped together.

As an illustrative example, let it be assumed that a user provides RTE specifications, for an RTE 303 of a target system 302 that is a single application platform (e.g., "software component" is selected in field 404 as indicated in FIG. 3A), that indicates the type of data sharing is explicit write and explicit read. In addition, and for this example, let it be assumed that the model 200 is part of another model with model constraints where latency is not a concern. Based on the explicit write with no latency concern, the code generator may generate write function 501*a* for write functionality block 202*a* of model 200. Specifically, the code generator may determine that write function 501*a* satisfies the explicit write with no latency concern since write function 501*a* with service access point 502*a*, e.g., "rtb_set(rtDW.DClock);", at the location in write function 501*a* as depicted in FIG. 4A writes the clock value at the end of the function and has the most delay. The code generator may generate read function 503*a* for read functionality block 202*b* of the model 200 based on the explicit read with no latency concern. Specifically, the code generator may determine that read function 503*a* satisfies the explicit read with no latency concern since read function 503*a* with service access point 504*a*, e.g., "real_T rtb_RTB=rtb_get( );", at the location in read function 503*a* reads the clock value at the beginning of the function at line 2 and uses the clock value computationally at lines 4 and 5.

Thus, under the example of explicit write and explicit read and model constraints where latency is not a concern, the code generator generates the code 301 with service access points 502*a* and 504*a* to be deployed on a target system 302 including the RTE 303. That is, the code generator determines that the service access points 502*a* and 504*a* at their locations in the code would allow the model constraints and RTE specifications to be satisfied when the RTE 303 implements the data transfer RTE service. Therefore, and when the code 301 executes on target system 302 that includes a software platform that is a single application platform, the service access points 502*a* and 504*a* interface with the RTE 303 and call the RTE service code that executes to implement the data transfer RTE service, while also satisfying the model constraints and RTE specifications.

As another example, let it be assumed that a user provides RTE specifications, for an RTE 303 of a target that is a single application platform, that indicates explicit write and explicit read. In addition, and for this example, let it be assumed that model 200 is part of another model with model constraints where latency is not a concern for the explicit write and latency is a concern for the explicit read. Based on the explicit write with no latency concern, the code generator may generate write function 501*a* for write functionality block 202*a* of model 200. Specifically, the code generator may determine that write function 501*a* satisfies the explicit write with no latency concern since write function 501*a* with service access point 502*a*, e.g., "rtb_set(rtDW.DClock);", at the location in write function 501*a* as depicted in FIG. 4A writes the clock value at the end of the function and has the most delay. The code generator may generate read function 503*b* for read functionality block 202*b* of the model 200 based on the explicit read with latency concern. Specifically, the code generator may determine that read function 503*b* satisfies the explicit read with latency concern since read function 503*b* with service access point 504*b*, e.g., rtb_RTB=rtb_get( );", at the location in read function 503*b* reads the clock at the value at code line 4 and uses the clock value computationally at lines 5 and 6.

Under this example of RTE specifications and model constraints, the code generator generates the code 301, with generated service access points 502*a* and 504*b* that are at locations in the code 301, to be deployed on target system 302 including RTE 303. That is, the code generator determines that the service access points 502*a* and 504*b* at their locations in the code 301 would allow the model constraints and RTE specifications to be satisfied when the RTE 303 implements the data transfer RTE service. Therefore, and when the code 301 executes on target system 302 that includes a software platform that is a single application platform, the service access points 502*a* and 504*b* interface with the RTE 303 and call the RTE service code that executes to implement the data transfer RTE service by executing RTE service code, while also satisfying the model constraints and RTE specifications.

Figure 6:
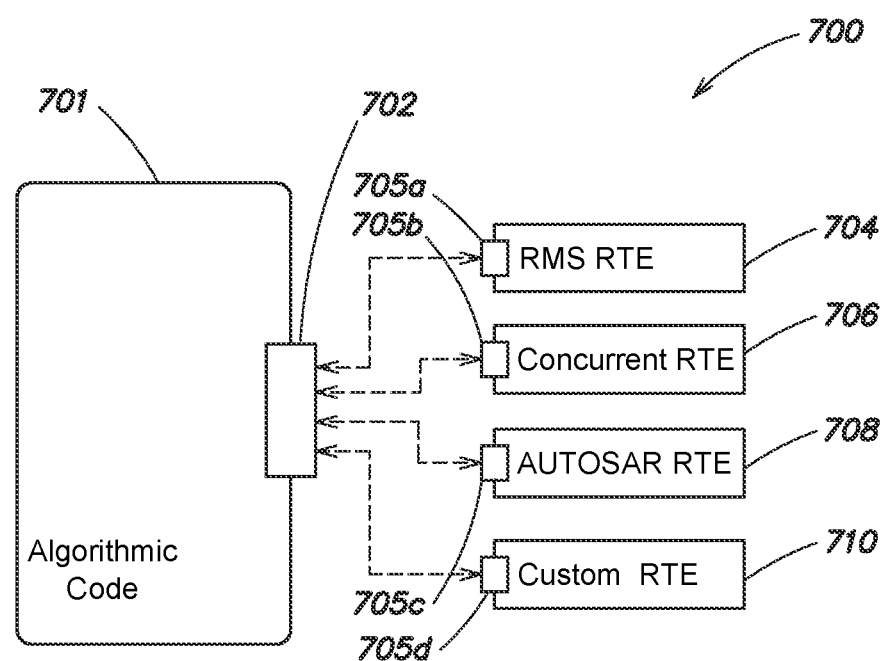
FIG. 6 is an illustration of an example high-level block diagram of code that includes an interface for communicating with different RTEs according to one or more embodiments described herein.

Advantageously, the code 301 can be automatically generated for different RTEs that have different deployment specifications. Specifically, and referring to FIG. 6, code 701 may be generated for a model and include interface 702. Interface 702 may represent the service access points generated according to the one or more embodiments described herein and that interface with the RTE. Although schematically shown as a single block at one location on the block that represents the code 701, as described previously, various service access points for various RTE services can be at different locations in the code 701.

Because the generation of the service access points and their locations in code 701 is based on the analysis of the model constraints and deployment specifications (e.g., RTE specifications or OS specifications), the interface 702, e.g., representing the service access points, is configurable to operate with different RTEs 704-710 that may have different deployment specifications, where interfaces 705*a*-*d* may represent the service layers of RTEs 704-710. Thus, code 701 for the same model can be regenerated for the different RTEs 704-710 based on the deployment specifications. This allows for easy reuse of the model and its code across the different RTEs 704-710.

In addition, the generation of the service access points at locations in the code 301 can provide separation of the model 200 and RTE 303 such that functionality design can be reused for different RTEs. This is because the two sources for the generation and location of the service access points are the model, e.g., model constraints, and deployment specifications, which are separate and distinct. Advantageously, code can be automatically regenerated for different deployment specifications without modifying the model such that the code satisfies the deployment specifications when the code executes on the target system 302. Further, model 200 can be modified and the modified model can be reused with different RTEs based on the utilization of different deployment specifications. In addition, a user does not have to know or provide the detailed low-level deployment specifications, e.g., how an RTE service is implemented, and instead need only provide high-level deployment specifications, e.g., type of data sharing, such that the generated code for the model is operable with the target system.

Figure 5:
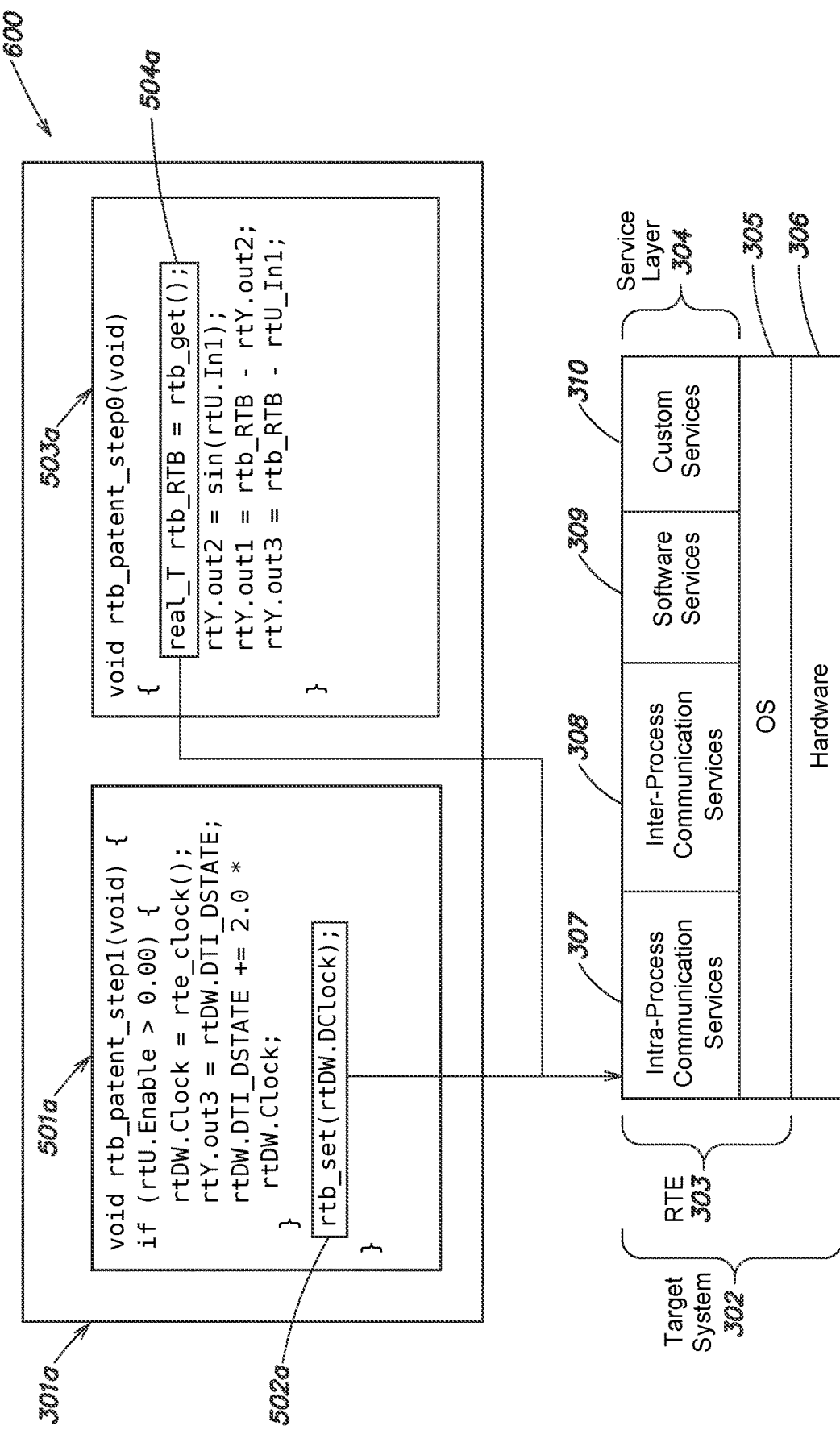
FIG. 5 is an illustration of another example abstracted layer view of code generated in FIG. 4A with service access points that may be deployed on a target system with an RTE according to one or more embodiments described herein.

FIG. 5 is an illustration of another example abstracted layer view 600 of code 301*a*, generated in FIG. 4A with service access points, that may be deployed on a target system 302 according to one or more embodiments described herein. In this example, the code 301*a* includes functions 501*a* and 503*a* generated based on the analysis of the model constraints (e.g., latency of the clock value is not a concern) and RTE specifications (e.g., explicit write and explicit read). Specifically, the generation of the service access points 502*a* and 504*a* and their location in the code 301*a* is based on the analysis of the model constraints and the RTE specifications. The code 301*a* may be deployed and executed on target system 302. When executed, service access point 502*a* of write function 501*a* and service access point 504*a* of read function 503*a* interface with the intra-process communications services 307, and call the RTE service code to implement the data transfer RTE service that writes out the clock value to the RTE 303 and allows for the clock value to be read from the RTE 303, such that the model constraints and RTE specifications are satisfied.

RTE service code may be executed to implement the explicit read, for the data transfer RTE service, in a plurality of different ways such that the model constraints and RTE specifications are satisfied. The implementation of the explicit read may be the low-level RTE specifications, as described above. Specifically, RTE service code may be executed to implement the explicit read by disabling an interrupt, performing the read, and then enabling the interrupt. Alternatively, RTE service code may be executed to implement the explicit read using data buffering. Alternatively, RTE service code may be executed to implement the explicit read utilizing an atomic read. Of the three different implementations, the disable/enable interrupt scheme is most memory efficient, but least time efficient. The data buffering scheme is more time efficient than the disable/enable interrupt scheme, but less memory efficient. The atomic read is the most time efficient but limited in that it relies on the word size of a given target system.

In parallel to generating the code 301 with the service access points at locations in the code 301 according to the one or more embodiments described herein, the code generator may provide information regarding one or more admissible implementations of the plurality of different ways an RTE service may be implemented. Specifically, the code generator may analyze the model constraints and the deployment specifications (e.g., RTE Specifications and OS Specifications) to determine one or more admissible implementations of the plurality of different implementations. Continuing with the above example with respect to the explicit read, let it be assumed that the user provides, in process threads entry 413 of GUI 400A, single-core processing that supports interrupts to further define the RTE specifications. In addition, let it be assumed that model constraints include a bounded range of latency that is allowed. The code generator may determine that the disable/enable interrupt scheme is the admissible implementation for the explicit read based on the model constraints (e.g., bounded latency range that is allowed) and that satisfies the RTE specifications (e.g., explicit read and single-core processing).

Alternatively, let it be assumed that the user provides, in process threads entry 413 of GUI 400A, multi-core processing to further define the RTE specifications. The code generator may determine that data buffering or atomic read are admissible implementations. Specifically, the code generator may determine that data buffering is an admissible implementation based on the model constraints (e.g., bounded range of latency that is allowed) and that satisfies the RTE specifications (e.g., explicit read and multi-core processing). The code generator may also determine that atomic read is an admissible implementation based on the model constraints (e.g., bounded range of latency that is allowed) and that satisfies the RTE specifications (e.g., explicit read and multi-core processing).

As another example, let it be assumed that the RTE specifications indicate that the target system supports both single-core processing and multi-core processing for explicit read, and the model constraints include the bounded range of latency that is allowed. The code generator may determine that (1) disable/enable interrupt may be an admissible implementation for single-core processing for explicit read, and (2) data buffering may be an admissible implementation for multi-core processing for explicit read. Therefore, and in an embodiment, the totality (e.g., aggregation) of the RTE specifications may affect the determination of the admissible implementations for explicit reads for data shared by code running on a single core, and also for data shared by code running on multiple cores. Advantageously, different models can be utilized with the target platform based on the analysis of the RTE specifications that are independent of the models.

Thus, the code generator can determine one or more admissible implementation for an RTE service based on the model constraints and RTE specifications. Therefore, a user can provide only the high-level deployment specifications (e.g., explicit read and multi-core processing/single-core processing) to determine which implementation, of a plurality of different implementations, is best suited for the RTE 303 of the target system 302, and thus does not need to know or provide the low-level specifications. As such, errors, e.g., utilizing an implementation that is inconsistent with the operation of the RTE 303, may be avoided. In addition, and by providing the one or more admissible implementations as a suggestion, the one or more embodiments described herein can provide an improvement in the field of designing and/or configuring target systems. Specifically, because the user of the target system 302 is provided with the admissible implementations, the user may not have to determine which implementations are compatible/incompatible with the target system 302 such that the target system operates in the desired manner. As such, according to the one or more embodiments described herein, less time and resources can be utilized during the design and configuration process of the target system 302. Information regarding the one or more admissible implementations may be provided, for example, to a user of the target system 302 via a user interface of a processing device. RTE service code may be generated for an admissible implementation based on the information received, and the RTE service code may be executed to implement the explicit read of the data transfer RTE service while satisfying the model constraints and RTE specifications.

Figure 7:
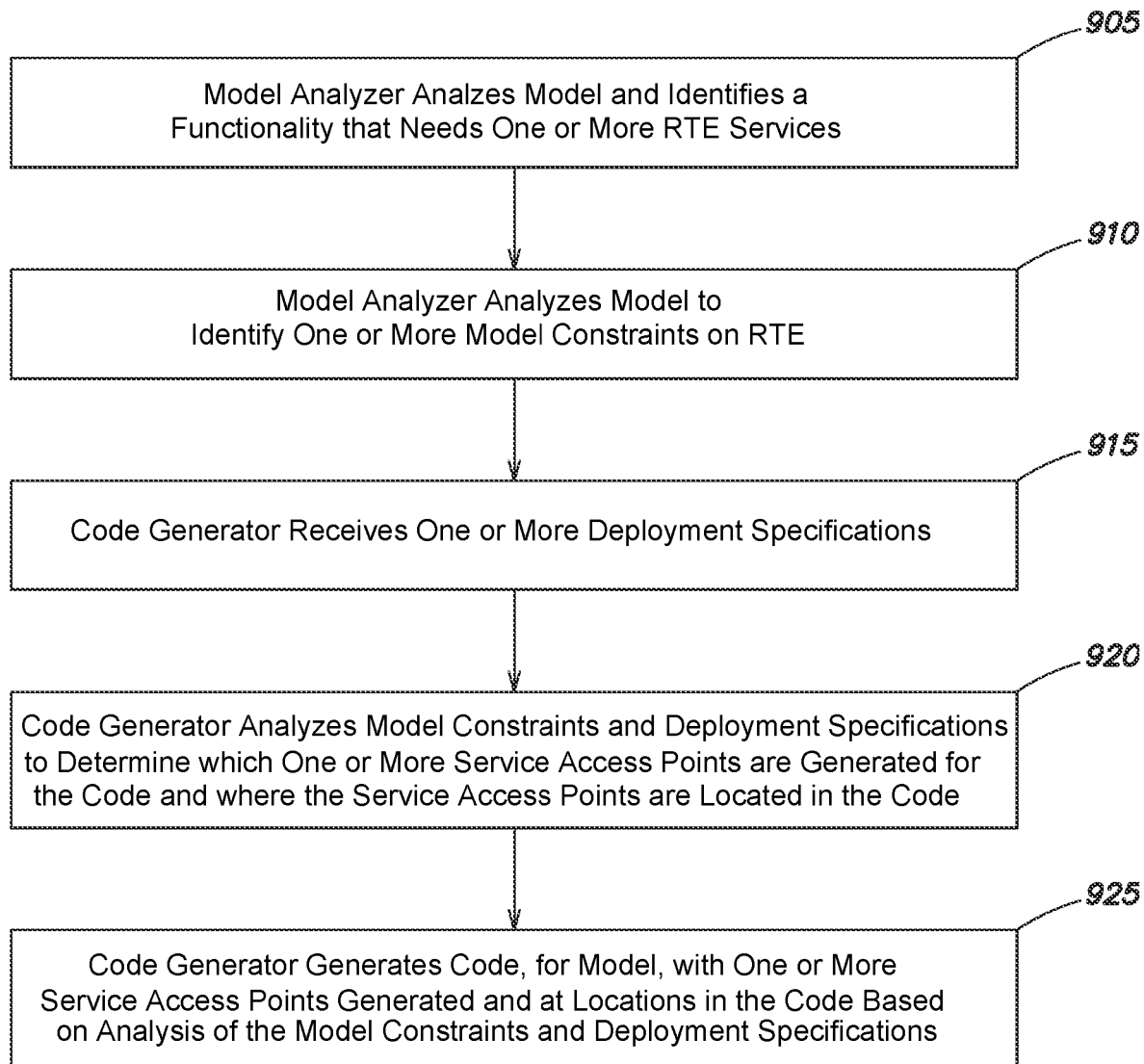
FIG. 7 is a flow diagram of an example method for generating code, for an executable model, with one or more service access points generated and at locations in the code based on an analysis of model constraints and deployment specifications (e.g., RTE specifications or OS specifications) according to one or more embodiments described herein.

FIG. 7 is a flow diagram of an example method for generating code, for a model, with one or more service access points generated and at locations in the code based on an analysis of model constraints and deployment specifications (e.g., RTE specifications or OS specifications) according to one or more embodiments described herein. A model analyzer, at block 905, may analyze a model to identify a functionality in the model that needs one or more RTE services. For example, the RTE service may be an intra-process communication service, an inter-process communication service, a software service, and/or a custom service. The model analyzer, at step 910, may analyze the model to identify one or more model constraints on the RTE. In an embodiment, model constraints affect timing, coherency, and/or latency of data associated with the model.

A code generator, at block 915, may receive one or more deployment specifications. In an embodiment, the deployment specifications may be RTE specifications that describe the operation (e.g., scheduling techniques utilized by the RTE, data sharing techniques utilized by the RTE, and/or intra-process communication techniques utilized by the RTE) of the RTE when executing RTE service code to implement RTE services on a target system 302 that is a single application platform. In an implementation, the deployment specifications may be OS specifications that describe the operation of the RTE when executing RTE service code to implement RTE services on a target system that is multi-application platform. In an embodiment, the deployment specifications need not include a low-level description that may describe how an RTE service needed by the code 301 is implemented. The deployment specifications may be received via a GUI from a user, or, alternatively, may be stored in a data structure, e.g., file.

At block 920, the code generator may analyze the model constraints and deployment specifications to determine which one or more service access points are generated for the code and where the service access points are located in the code. Specifically, the code generator may choose the service access points and their location in the code based on a determination that the service access points and their locations would allow the model constraints and deployment specifications to be satisfied when the RTE service code executes to implement the RTE service.

At block 925 the code generator generates code, for the model, with one or more service access points generated and at locations in the code based on the analysis of the model constraints and deployment specifications. The automatically generated code may be deployed on the target system 302, and the model constraints and deployment specifications are satisfied when the code executes. Although steps 920 and 925 are shown as being separate and distinct, it is expressly contemplated that steps 920 and 925 may be part of a single step. For example, the determinations made in step 920 may be done as part of the code generation process implemented by the code generator in step 925.

Figure 8:
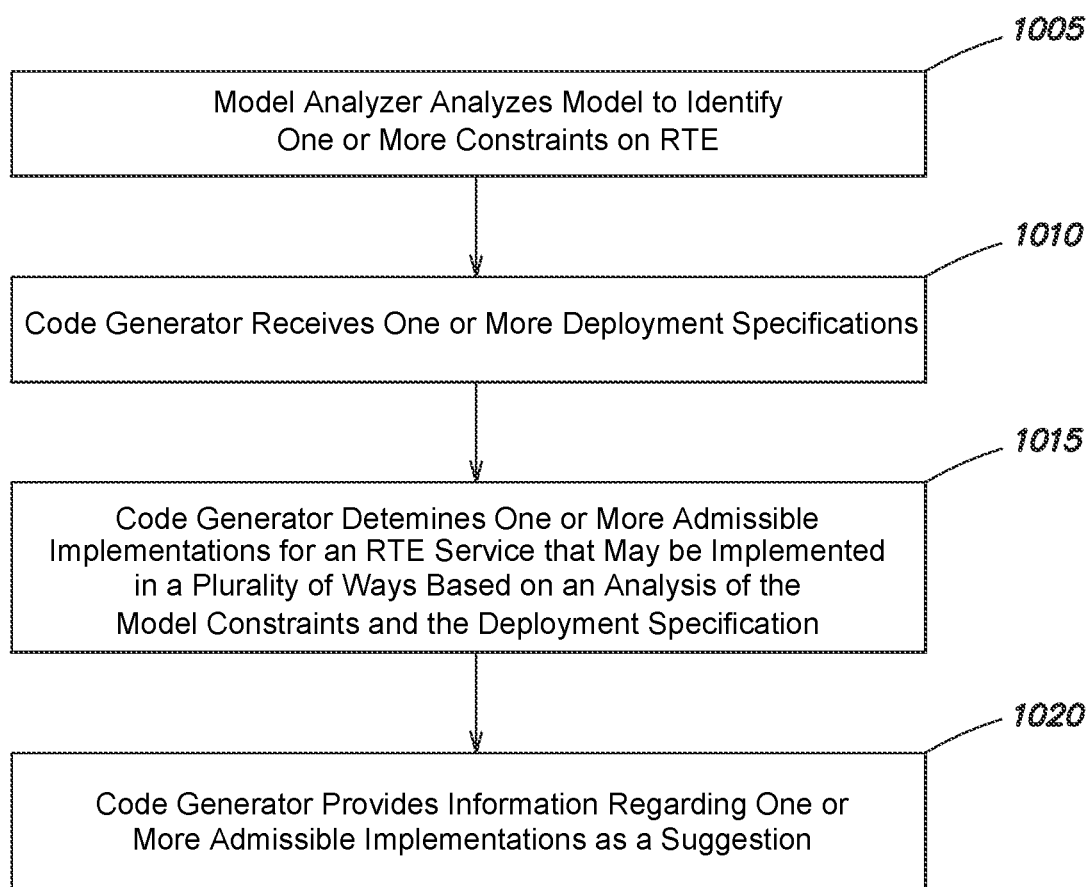
FIG. 8 is a flow diagram of an example method for providing information regarding one or more admissible implementations of an RTE service that may be implemented in a plurality of different ways according to one or more embodiments described herein.

FIG. 8 is a flow diagram of an example method for determining one or more admissible implementations for an RTE service that may be implemented in a plurality of different ways according to one or more embodiments described herein. The model analyzer, at step 1005, may analyze the model to identify one or more model constraints on the RTE. In an embodiment, model constraints affect timing, coherency, and/or latency of data associated with the model.

The code generator, at block 1010, may receive one or more deployment specifications. In an embodiment, the deployment specifications are RTE specifications that describe the operation (e.g., scheduling techniques utilized by the RTE, data sharing techniques utilized by the RTE, and/or intra-process communication techniques utilized by the RTE) of the RTE when executing RTE service code to implement RTE services on a target system 302 that is a single application platform. In an implementation, the deployment specifications may be OS specifications that describe the operation of the RTE when executing RTE service code to implement RTE services on a target system 302 that is a multi-application platform. In an embodiment, the deployment specifications need not include a low-level description that may describe how an RTE service needed by the code 301 is implemented. The deployment specifications may be received via a GUI from a user, or, alternatively, may be stored in and received from a data structure, e.g., file.

The code generator, at block 1015, may determine one or more admissible implementations for an RTE service that may be implemented in a plurality of different ways based on an analysis of model constraints and the deployment specifications. Specifically, the code generator may choose the one or more admissible implementations based on a determination that the model constraints and deployment specifications would be satisfied when the RTE service is implemented according to the admissible implementation, and that the model constraints and deployment specifications would not be satisfied when the RTE service is implemented according to the other implementations.

Advantageously, and according to the one or more embodiments described herein, the user does not have to be concerned with whether the generated code satisfies the deployment specifications. Specifically, the user does not have to, for example, modify a model based on the deployment specifications to ensure that the code generated from the model satisfies the deployment specifications when executed on the target system, which may be required by conventional systems. Instead, the one or more embodiments described herein automatically generate code from the model such that the code for the admissible implementation satisfies the deployment specifications when the code executes on the target system.

The code generator, at block 1020, may provide information regarding the one or more admissible implementations as a suggested implementation. For example, one or more identifiers for the one or more admissible implementations or code (e.g., RTE service code) for the one or more admissible implementations may be provided to a user of the target system via a user interface of a processing device. If, based on the analysis, the code generator determines that there are no admissible implementations, the user of the target system may be notified and the user may modify the model and/or one or more parameters/characteristics associated with the target system such that the target system may operate as desired. Additionally, admissible implementations may change based on a modification (e.g., removal) of the model constraints and/or the deployment specifications. For example, if the model constraint for two functions executing in a mutual exclusive manner were to be removed, the code generator may determine that different implementations of data sharing are admissible, and information regarding the different implementations may be provided as the suggested implementations that would satisfy the deployment specifications when code generated from the model executes on the target system.

It is noted that, in some embodiments, one of the example methods shown in FIGS. 7 and 8 may be performed, while in other embodiments, both of the example methods shown in FIGS. 7 and 8 may be performed.

Figure 9:
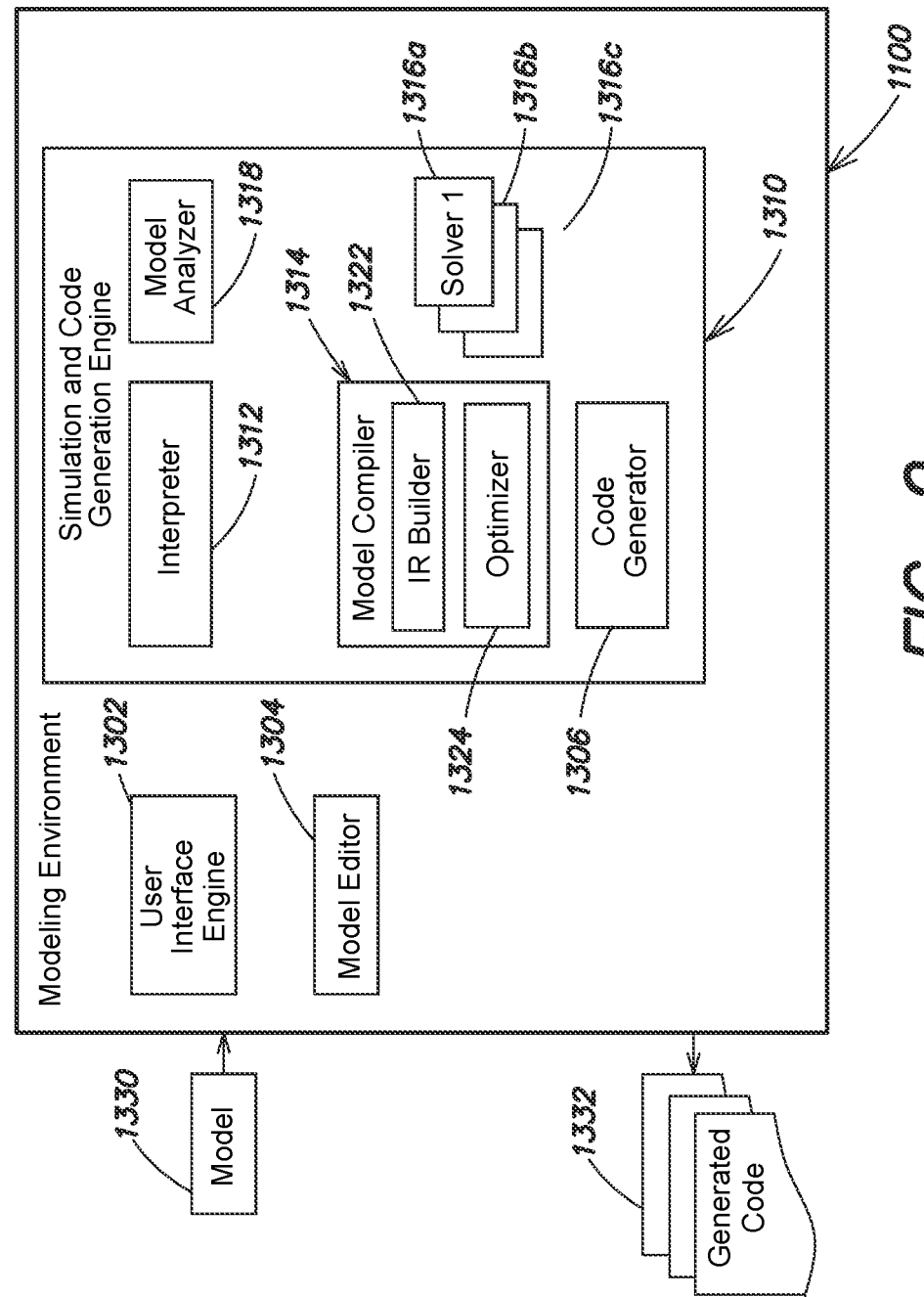
FIG. 9 is a partial, schematic illustration of an example modeling environment in accordance with one or more embodiments described herein.

FIG. 9 is a partial, schematic illustration of an example modeling environment 1100 in accordance with one or more embodiments described herein. The modeling environment 1100 may include a User Interface (UI) engine 1302, a model editor 1304, a code generator 1306, and a simulation and code generation engine 1310. The UI engine 1302 may create and present one or more User Interfaces (UIs), such as Graphical User Interfaces (GUIs) and/or Command Line Interfaces (CLIs), on the display of a processing device, e.g., workstation, a laptop, a hand-held device, such as a mobile phone or a tablet, or other data processing device. The GUIs and CLIs may provide a user interface to the modeling environment 1100, such as a model editing window. The model editor 1304 may perform selected operations on a model, such as open, create, edit, and save, in response to user inputs or programmatically.

The simulation and code generation engine 1310 may include an interpreter 1312, a code generator 1306, a model compiler 1314, one or more solvers, such as solvers 1316a-c, and a model analyzer 1318. The model compiler 1314 may include one or more Intermediate Representation (IR) builders, such as IR builder 1322. In some implementations, one or more IR builders may be included or associated with the solvers 1316a-c. The model analyzer may identify one or more functionalities in model 1330 that may need one or more RTE services according to one or more embodiments described herein. In addition, the model analyzer may determine one or more model constraints on an RTE according to one or more embodiments described herein.

The modeling environment 1100 may access a computer-based, executable graphical model, such as model 1330, e.g., model 200. Simulation of a model may include generating and solving a set of equations, and may involve one or more of the solvers 1316*a-c*. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the Simulink User's Guide from The MathWorks, Inc. (March 2016 ed.)

The code generator 1306 may generate code, such as generated code 1332, for the model 1330. The generated code 1332, e.g., code 301*a*, generated by the code generator 1306 may include service access points that are generated and are located in the generated code based on an analysis of model constraints and deployment specifications according to one or more embodiments described herein. In addition, the code generator 1306 may determine, based on an analysis of model constraints and deployment specifications, one or more admissible implementations for an RTE service that may be implemented in a plurality of different ways according to one or more embodiments described herein. The user interface engine 1302 may provide or support a Code Generation button in a GUI that may be selected by the user, or the user interface engine 1302 may receive a code generation command entered by the user, e.g., in the GUI or the CLI. The code generation command also may be invoked programmatically, for example, when a particular event occurs. In response to the code generation command being activated, the code generator 1306 may generate code, such as the code 1332, for the model 1330.

The behavior of the generated code 1332 may be functionally equivalent to the behavior of the executable model 1330.

The generated code 1332 may be textual code, such as textual source code, that may be executed on a target machine or device (i.e., target system), which may not include a modeling environment and/or a simulation and code generation engine. The generated code 1332 may conform to one or more programming languages, such as Ada, Basic, C, C++, C #, SystemC, FORTRAN, VHDL, Verilog, MATLAB/embedded MATLAB, a vendor or target specific HDL code, such as Xilinx FPGA libraries, assembly code, etc. The generated code 1332 may include header, main, make, and other source files. The generated code may be executed by target hardware, such as a microprocessor, a Digital Signal Processor (DSP), etc. In some embodiments, the generated code 1332 may be accessed by a hardware synthesis tool chain, which may configure a programmable hardware device, such as a Field Programmable Gate Array (FPGA), a System on a Chip (SoC), etc., from the generated code 1332. The model 1330 and the generated code 1332 may be stored in memory, e.g., persistent memory, such as a hard drive or flash memory, of a data processing device. The modeling environment 1100 may be loaded into and run from the main memory of a data processing device.

In some implementations, the code generator 1306 may be separate, such as a separate application program, from the modeling environment 1100. The code generator 1306 may also be run on a different data processing device than the data processing device running the modeling environment 1100. In such embodiments, the code generator 1306 may access the model 1330, which may be stored in memory in the form of one or more files, and generate the code 1332 for the model 1330.

In some embodiments, one or more of the user interface engine 1302, the model editor 1304, the code generator 1306, and the simulation and code generation engine 1310 may be implemented through one or more software modules or libraries containing program instructions that perform the methods described herein. The software modules may be stored in a memory, such as a main memory, a persistent memory, and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, one or more of the user interface engine 1302, the model editor 1304, the code generator 1306, and the simulation and code generation engine 1310 may comprise hardware registers and combinational logic configured and arranged to produce sequential logic circuits. In some embodiments, various combinations of software and hardware, including firmware, may be utilized to implement the described methods.

Figure 10:
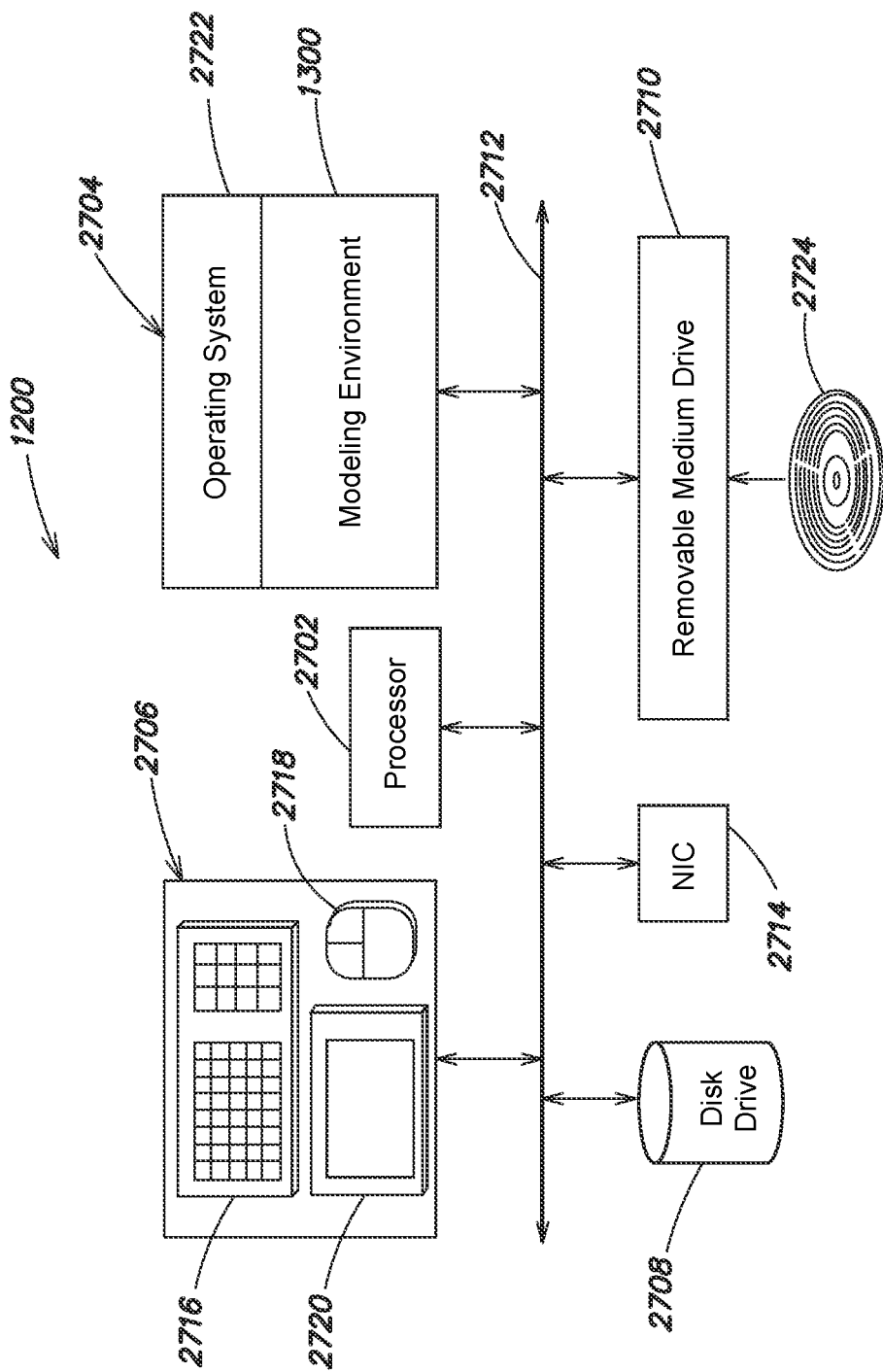
FIG. 10 is a schematic illustration of an example computer or data processing system in accordance with one or more embodiments described herein.

FIG. 10 is a schematic illustration of an example computer or data processing system 1200 in accordance with one or more embodiments described herein. The computer system 1200 may include one or more processing elements, such as a processor 2702, a main memory 2704, user input/output (I/O) 2706, a persistent data storage unit, such as a disk drive 2708, and a removable medium drive 2710 that are interconnected by a system bus 2712. The computer system 1200 may also include a communication unit, such as a network interface card (NIC) 2714. The user I/O 2706 may include a keyboard 2716, a pointing device, such as a mouse 2718, and a display 2720. Other user I/O 2706 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2704, which may be a Random Access Memory (RAM), may store a plurality of program libraries or modules, such as an operating system 2722, and one or more application programs that interface to the operating system 2722, such as the modeling environment 1100.

The removable medium drive 2710 may accept and read a computer readable medium 2726, such as a CD, DVD, floppy disk, solid state drive, tape, flash memory or other non-transitory medium. The removable medium drive 2710 may also write to the computer readable medium 2724.

Suitable computer systems include personal computers (PCs), workstations, servers, laptops, tablets, palm computers, smart phones, electronic readers, and other portable computing devices, etc. Nonetheless, those skilled in the art will understand that the computer system 1200 of FIG. 10 is intended for illustrative purposes only, and that the present invention may be used with other computer, data processing, or computational systems or devices. The present invention may also be used in a computer network, e.g., client-server, architecture, or a public and/or private cloud computing arrangement. For example, the modeling environment 1100 may be hosted on one or more cloud servers or devices, and accessed by remote clients through a web portal or an application hosting system, such as the Remote Desktop Connection tool from Microsoft Corp.

Suitable operating systems 2722 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2722 may provide services or functions for applications or modules, such as allocating memory, organizing data objects or files according to a file system, prioritizing requests, managing I/O, etc. The operating system 2722 may run on a virtual machine, which may be provided by the data processing system 1200.

As indicated above, a user, such as an engineer, scientist, programmer, developer, etc., may utilize one or more input devices, such as the keyboard 2716, the mouse 2718, and the display 2720 to operate the modeling environment 1100, and construct and revise one or more models. As discussed, the models may be computational and may have executable semantics. In particular, the models may be simulated or executed. In particular, the models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

Figure 11:
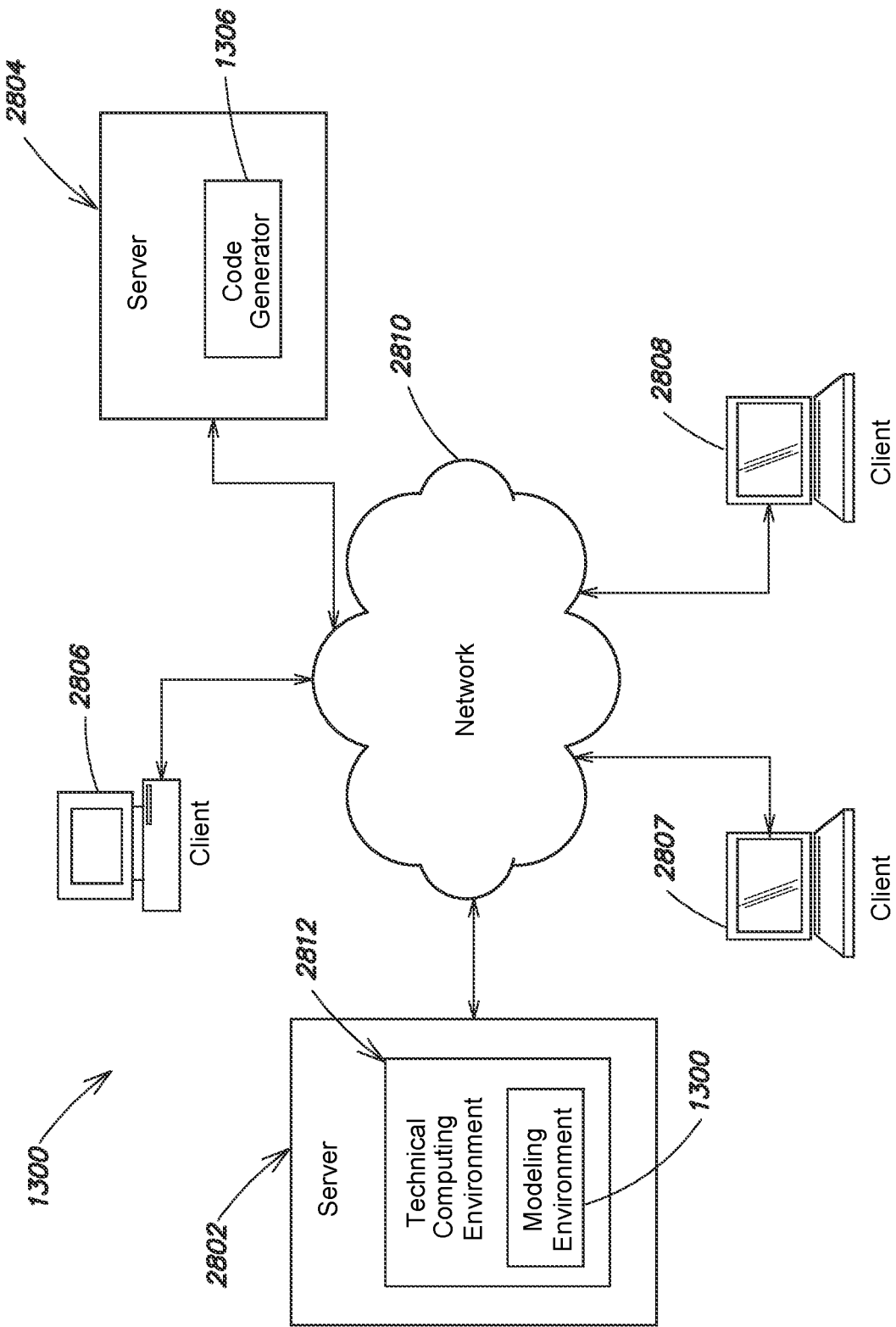
FIG. 11 is a schematic illustration of an example distributed computing environment in which systems and/or methods may be implemented in accordance with one or more embodiments described herein.

FIG. 11 is a schematic illustration of an example distributed computing environment 1300 in which systems and/or methods may be implemented in accordance with one or more embodiments described herein. The environment 1300 may include client and server devices, such as two servers 2802 and 2804, and three clients 2806-2808, interconnected by one or more networks, such as network 2810. The servers 2802 and 2804 may include applications or processes accessible by the clients 2806-2808. For example, the server 2802 may include a technical computing environment (TCE) 2812, which may include or have access to a modeling environment, such as the modeling environment 1100. The server 2804 may include a code generator, such as the code generator 1306. The devices of the environment 1300 may interconnect via wired connections, wireless connections, or a combination of wired and wireless connections.

The servers 2802 and 2804 may include one or more devices capable of receiving, generating, storing, processing, executing, and/or providing information. For example, the servers 2802 and 2804 may include a computing device, such as a server, a desktop computer, a laptop computer, a tablet computer, a handheld computer, or a similar device. In some implementations, the servers 2802 and 2804 may host the TCE 2812, the modeling environment 1100, and/or the code generator 1306.

The clients 2806-2808 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2806-2808 may download data and/or code from the servers 2802 and 2804 via the network 2810. In some implementations, the clients 2806-2808 may be desktop computers, workstations, laptop computers, tablet computers, handheld computers, mobile phones (e.g., smart phones, radiotelephones, etc.), electronic readers, or similar devices. In some implementations, the clients 2806-2808 may receive information from and/or transmit information to the servers 2802 and 2804.

The network 2810 may include one or more wired and/or wireless networks. For example, the network 2810 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 11 is provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11F may be implemented as multiple, distributed devices. Additionally, one or more of the devices of the distributed computing environment 1300 may perform one or more functions described as being performed by another one or more devices of the environment 1200.

The following examples implement one or more aspects of methods and/or systems of the present disclosure. These examples are non-limiting examples. Features of different examples may be combined in other implementations. Features of each example may be modified or removed in other implementations.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a human user of a computer or data processing system, unless otherwise stated.

Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2000. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

The subject-matter according to the description above may also be considered to comprise the following aspects 1 to 40:

Aspect 1. A method, comprising:
identifying, by a processor, a functionality in an executable model that needs a runtime environment (RTE) service to be implemented by an RTE, wherein the executable model when executed simulating a behavior of a system;
receiving one or more RTE specifications that describe one or more operations of the RTE when executing RTE service code to implement the RTE service;
analyzing one or more model constraints of the executable model and the one or more RTE specifications; and
generating code from the executable model based on the analyzing, wherein the generating comprises: (1) generating one or more service access points for the code, wherein the one or more service access points interface with the RTE and call the RTE code to implement the RTE service, and (2) determining a location for each of the one or more service access points in the code, or
determining an implementation, of a plurality of different implementations, for the RTE service based on the analysis of the one or more model constraints and the one or more RTE specifications, wherein the RTE service is configured to be implemented in a plurality of different ways utilizing the plurality of different implementations.

Aspect 2. The method of aspect 1, wherein the functionality is one of a rate transition block, a sine wave, an integrator, an error status, an output port, an input port, or a parameter.

Aspect 3. The method of one or more previous aspects, wherein the one or more model constraints are determined by analyzing one or more model parameters of the executable model utilizing one or more algorithms or techniques, and wherein the one or model constrains affect one or more of timing, coherency, or latency of data associated with the executable model.

Aspect 4. The method of one or more previous aspects, wherein the one or more RTE specifications describe one or more of a scheduling technique utilized by the RTE when the RTE code executes, an intra process communication technique utilized by the RTE when RTE code executes, or a basic service utilized by the RTE when RTE code executes.

Aspect 5. The method of one or more previous aspects, where the code for the executable model is generated, the method further comprising:
modifying the one or more RTE specifications to produce one or more modified RTE specifications;
analyzing the one or more model constraints of the executable model and the one or more modified RTE specifications; and
generating, without modifying the executable model, the code from the executable model based on the analyzing the one or more model constraints of the executable model and the one or more modified RTE specifications, wherein the generating comprises:
generating the one or more service access points for the code, wherein the one or more service access points interface with the RTE and call the RTE code to implement the RTE service, and
determining a different location for each of the one or more service access points in the code.

Aspect 6. The method of one or more previous aspects, where the code for the executable model is generated, the method further comprising:
receiving one or more different RTE specifications that describe the one or more operations of a different RTE that implements a different RTE service;
analyzing the one or more model constraints of the executable model and the one or more different RTE specifications; and
generating different code from the executable model and for the different RTE based on the analyzing, wherein the generating comprises:
generating one or more different service access points for the different code, wherein the one or more different service access points interface with the RTE and call different RTE code to implement the different RTE service, and determining a different location for each of the one or more different service access points in the different code.

Aspect 7. The method of one or more previous aspects, where the code for the executable model is generated, the code is utilized with a plurality of different RTEs.

Aspect 8. The method of one or more previous aspects, where the implementation is determined, the method further comprising:
receive one or more different RTE specifications;
analyzing the one or more model constraints of the executable model and the one or more different RTE specifications; and
determining a different implementation, of the plurality different implementations, for the RTE service based on the analysis of the one or more model constraints and the one or more different RTE specifications.

Aspect 9. The method of one or more previous aspects, wherein the implementation and the different implementation are a same implementation.

Aspect 10. The method of one or more previous aspects, wherein the implementation and the different implementation are different implementations.

Aspect 11. A system, comprising:
a processor coupled to a memory, the processor configured to:
identify a functionality in an executable model that needs a runtime environment (RTE) service to be implemented by an RTE, wherein the executable model when executed simulating a behavior of a system;
receive one or more RTE specifications that describe one or more operations of the RTE when executing RTE service code to implement the RTE service;
analyze one or more model constraints of the executable model and the one or more RTE specifications; and
generate code from the executable model based on the analyzing, wherein the generate comprises: (1) generating one or more service access points for the code, wherein the one or more service access points interface with the RTE and call the RTE code to implement the RTE service, and (2) determining a location for each of the one or more service access points in the code, or
determine an implementation, of a plurality of different implementations, for the RTE service based on the analysis of the one or more model constraints and the one or more RTE specifications, wherein the RTE service is configured to be implemented in a plurality of different ways utilizing the plurality of different implementations.

Aspect 12. The system of aspect 11, wherein the functionality includes one of a rate transition block, a sine wave, an integrator, an error status, an output port, an input port, or a parameter.

Aspect 13. The system of one or more of aspects 11 to 12, wherein the one or more model constraints are determined by analyzing one or more model parameters of the executable model utilizing one or more algorithms or techniques, and wherein the one or model constrains affect one or more of timing, coherency, or latency of data associated with the executable model.

Aspect 14. The system of one or more of aspects 11 to 13, wherein the one or more RTE specifications describe one or more of a scheduling technique utilized by the RTE when the RTE code executes, an intra process communication technique utilized by the RTE when RTE code executes, or a basic service utilized by the RTE when RTE code executes.

Aspect 15. The system of one or more of aspects 11 to 14, where the code for the executable model is generated, wherein the processor is further configured to:
  modify the one or more RTE specifications to produce one or more modified RTE specifications;
  analyze the one or more model constraints of the executable model and the one or more modified RTE specifications; and
  generate, without modifying the executable model, the code from the executable model based on the analyzing, wherein the generate comprises:
    generating the one or more service access points for the code, wherein the one or more service access points interface with the RTE and call the RTE code to implement the RTE service, and
    determining a location for each of the one or more service access points in the code.

Aspect 16. The system of one or more of aspects 11 to 15, where the code for the executable model is generated, the processor further configured to:
  receive one or more different RTE specifications that describe the one or more operations of a different RTE that implements a different RTE service;
  analyze the one or more model constraints of the executable model and the one or more different RTE specifications; and
  generate different code from the executable model and for the different RTE based on the analyzing, wherein the generate comprises:
    generating one or more different service access points for the different code, wherein the one or more different service access points interface with the RTE and call different RTE code to implement the different RTE service, and
    determining a different location for each of the one or more different service access points in the different code.

Aspect 17. The system of one or more of aspects 11 to 16, where the code for the executable model is generated, wherein the generated code is utilized with a plurality of different RTEs.

Aspect 18. One or more non-transitory computer-readable media, having stored thereon instructions that when executed by a computing device, cause the computing device to perform operations comprising:
  receiving one or more runtime environment (RTE) RTE specifications that describe one or more operations of an RTE when executing RTE service code to implement an RTE service;
  analyzing one or more model constraints of an executable model and the one or more RTE specifications, wherein the executable model when executed simulating a behavior of a system; and
  generating code from the executable model based on the analyzing, wherein the generating comprises: (1) generating one or more service access points for the code, wherein the one or more service access points interface with the RTE and call the RTE code to implement the RTE service, and (2) determining a location for each of the one or more service access points in the code, or
  determining an implementation, of a plurality of different implementations, for the RTE service based on the analysis of the one or more model constraints and the one or more RTE specifications, wherein the RTE service is configured to be implemented in a plurality of different ways utilizing the plurality of different implementations.

Aspect 19. The one or more non-transitory computer-readable media of aspect 18, wherein the one or more model constraints are determined by analyzing one or more model parameters of the executable model utilizing one or more algorithms or techniques, and wherein the one or model constrains affect one or more of timing, coherency, or latency of data associated with the executable model.

Aspect 20. The one or more non-transitory computer-readable media of one or more of aspects 18 to 19, wherein the one or more RTE specifications describe one or more of a scheduling technique utilized by the RTE when the RTE code executes, an intra process communication technique utilized by the RTE when RTE code executes, or a basic service utilized by the RTE when RTE code executes.

Aspect 21. One or more non-transitory computer-readable media, having stored thereon instructions that when executed by a computing device, cause the computing device to perform operations comprising:
  receiving one or more deployment specifications that describe one or more operations of an RTE when executing RTE service code to implement an RTE service;
  analyzing one or more model constraints of an executable model and the one or more deployment specifications, wherein the executable model when executed simulating a behavior of a system; and
  generating code from the executable model based on the analyzing, wherein the generating comprises: (1) generating one or more service access points for the code, wherein the one or more service access points interface with the RTE and call the RTE service code to implement the RTE service, and (2) determining a location for each of the one or more service access points in the code, wherein the generated code when executed satisfies the deployment specifications, or
  determining an implementation, of a plurality of different implementations, for the RTE service based on the analysis of the one or more model constraints and the one or more deployment specifications, wherein the RTE service is configured to be implemented in a plurality of different ways utilizing the plurality of different implementations, wherein the determined implementation satisfies the deployment specifications.

Aspect 22. The one or more non-transitory computer-readable media of aspect 21, wherein the functionality is one of a rate transition block, a sine wave, an integrator, an error status, an output port, an input port, or a parameter.

Aspect 23. The one or more non-transitory computer-readable media of one or more of aspects 21 to 22, wherein the one or more model constraints are determined by analyzing one or more model parameters of the executable model utilizing one or more algorithms or techniques, and wherein the one or model constrains affect one or more of timing, coherency, or latency of data associated with the executable model.

Aspect 24. The one or more non-transitory computer-readable media of one or more of aspects 21 to 23, wherein the one or more deployment specifications are one or more RTE specifications and the one or more RTE specifications describe one or more of a scheduling technique utilized by the RTE when the RTE service code executes, an intra process communication technique utilized by the RTE when the RTE service code executes, or a basic service utilized by the RTE when the RTE service code executes, or the one or more deployment specifications are one or more operating system (OS) specifications and the one or more OS specifications describe one or more of a process management technique utilized by the RTE when the RTE service code executes, a clock synchronization technique utilized by the RTE when the RTE service code executes, the intra process communication technique utilized by the RTE when the RTE service code executes, or the basic service utilized by the RTE when the RTE service code executes.

Aspect 25. The one or more non-transitory computer-readable media of one or more of aspects 21 to 24, where the code for the executable model is generated, the instructions cause the computing device to perform operations further comprising:

modifying the one or more deployment specifications to produce one or more modified deployment specifications;

analyzing the one or more model constraints of the executable model and the one or more modified deployment specifications; and generating, without modifying the executable model, the code from the executable model based on the analyzing the one or more model constraints of the executable model and the one or more modified deployment specifications, wherein the generating comprises:

generating the one or more service access points for the code, wherein the one or more service access points interface with the RTE and call the RTE service code to implement the RTE service, and determining a different location for each of the one or more service access points in the code.

Aspect 26. The one or more non-transitory computer-readable media of one or more of aspects 21 to 25, where the code for the executable model is generated, the instructions cause the computing device to perform operations further comprising:

receiving one or more different deployment specifications that describe the one or more operations of a different RTE that implements a different RTE service;

analyzing the one or more model constraints of the executable model and the one or more different deployment specifications; and generating different code from the executable model and for the different RTE based on the analyzing, wherein the generating comprises:

generating one or more different service access points for the different code, wherein the one or more different service access points interface with the RTE and call different RTE service code to implement the different RTE service, and determining a different location for each of the one or more different service access points in the different code.

Aspect 27. The one or more non-transitory computer-readable media of one or more of aspects 21 to 26, where the code for the executable model is generated, the code is utilized with a plurality of different RTEs.

Aspect 28. The one or more non-transitory computer-readable media of one or more of aspects 21 to 27, where the implementation is determined, the instructions cause the computing device to perform operations further comprising:

receiving one or more different deployment specifications;

analyzing the one or more model constraints of the executable model and the one or more different deployment specifications; and determining a different implementation, of the plurality of different implementations, for the RTE service based on the analysis of the one or more model constraints and the one or more different deployment specifications.

Aspect 29. The one or more non-transitory computer-readable media of one or more of aspects 21 to 28, wherein the implementation and the different implementation are a same implementation.

Aspect 30. The one or more non-transitory computer-readable media of one or more of aspects 21 to 29, wherein the implementation and the different implementation are different implementations.

Aspect 31. The one or more non-transitory computer-readable media of one or more of aspects 21 to 30, where the code for the executable model is generated, the instructions cause the computing device to perform operations further comprising:

determining, based on the analyzing, a model location in the model for a selected service access point of the one or more service access points; and inserting a graphical affordance representing the selected service access point at the determined model location in the model; and displaying, on a display device, the model with the inserted graphical affordance.

Aspect 32. The one or more non-transitory computer-readable media of one or more of aspects 21 to 31, where the code for the executable model is generated, the instructions cause the computing device to perform operations further comprising:

determining one or more deployment constraints associated with a target system on which the generated code is to be deployed, wherein the analyzing is based on the one or more model constraints, the one or more deployment specifications, and the one or more deployment constraints.

Aspect 33. A method, comprising:

identifying, by a processor, a functionality in an executable model that needs a runtime environment (RTE) service to be implemented by an RTE, wherein the executable model when executed simulating a behavior of a system;

receiving one or more deployment specifications that describe one or more operations of the RTE when executing RTE service code to implement the RTE service;

analyzing one or more model constraints of the executable model and the one or more deployment specifications; and generating code from the executable model based on the analyzing, wherein the generating comprises: (1) generating one or more service access points for the code, wherein the one or more service access points interface with the RTE and call the RTE service code to implement the RTE service, and (2) determining a location for each of the one or more service access points in the code, wherein the generated code when executed satisfies the deployment specifications, or determining an implementation, of a plurality of different implementations, for the RTE service based on the analysis of the one or more model constraints and the one or more deployment specifications, wherein the RTE service is configured to be implemented in a plurality of different ways utilizing the plurality of different implementations, wherein the determined implementation satisfies the deployment specifications.

Aspect 34. The method of aspect 33, wherein the functionality is one of a rate transition block, a sine wave, an integrator, an error status, an output port, an input port, or a parameter.

Aspect 35. The method of one or more of aspects 33 to 34, wherein the one or more model constraints are determined by analyzing one or more model parameters of the executable model utilizing one or more algorithms or techniques, and wherein the one or model constrains affect one or more of timing, coherency, or latency of data associated with the executable model.

Aspect 36. The method of one or more of aspects 33 to 35, wherein the one or more deployment specifications are one or more RTE specifications and the one or more RTE specifications describe one or more of a scheduling technique utilized by the RTE when the RTE service code executes, an intra process communication technique utilized by the RTE when the RTE service code executes, or a basic service utilized by the RTE when the RTE service code executes, or the one or more deployment specifications are one or more operating system (OS) specifications and the one or more OS specifications describe one or more of a process management technique utilized by the RTE when the RTE service code executes, a clock synchronization technique utilized by the RTE when the RTE service code executes, the intra process communication technique utilized by the RTE when the RTE service code executes, or the basic service utilized by the RTE when the RTE service code executes.

Aspect 37. The method of one or more of aspects 33 to 36, where the code for the executable model is generated, the method further comprising:

modifying the one or more deployment specifications to produce one or more modified deployment specifications;

analyzing the one or more model constraints of the executable model and the one or more modified deployment specifications; and generating, without modifying the executable model, the code from the executable model based on the analyzing the one or more model constraints of the executable model and the one or more modified deployment specifications, wherein the generating comprises:

generating the one or more service access points for the code, wherein the one or more service access points interface with the RTE and call the RTE service code to implement the RTE service, and determining a different location for each of the one or more service access points in the code.

Aspect 38. The method of one or more of aspects 33 to 37, where the code for the executable model is generated, the method further comprising:

receiving one or more different deployment specifications that describe the one or more operations of a different RTE that implements a different RTE service;

analyzing the one or more model constraints of the executable model and the one or more different deployment specifications; and generating different code from the executable model and for the different RTE based on the analyzing, wherein the generating comprises:

generating one or more different service access points for the different code, wherein the one or more different service access points interface with the RTE and call different RTE service code to implement the different RTE service, and determining a different location for each of the one or more different service access points in the different code.

Aspect 39. The method of one or more of aspects 33 to 38, where the code for the executable model is generated, the code is utilized with a plurality of different RTEs.

Aspect 40. A system, comprising:

a processor coupled to a memory, the processor configured to:

identify a functionality in an executable model that needs a runtime environment (RTE) service to be implemented by an RTE, wherein the executable model when executed simulating a behavior of a system;

receive one or more deployment specifications that describe one or more operations of the RTE when executing RTE service code to implement an RTE service;

analyze one or more model constraints of the executable model and the one or more deployment specifications; and generate code from the executable model based on the analyzing, wherein the generating comprises: (1) generating one or more service access points for the code, wherein the one or more service access points interface with the RTE and call the RTE service code to implement the RTE service, and (2) determining a location for each of the one or more service access points in the code, wherein the generated code when executed satisfies the deployment specifications, or determine an implementation, of a plurality of different implementations, for the RTE service based on the analysis of the one or more model constraints and the one or more deployment specifications, wherein the RTE service is configured to be implemented in a plurality of different ways utilizing the plurality of different implementations, wherein the determined implementation satisfies the deployment specifications.

What is claimed is:

1. One or more non-transitory computer-readable media, having stored thereon instructions that when executed by a computing device, cause the computing device to perform operations comprising:

receiving one or more deployment specifications that describe one or more operations of a runtime environment (RTE) when executing RTE service code to implement an RTE service;

analyzing one or more model constraints of an executable model and the one or more deployment specifications, wherein the executable model when executed simulating a behavior of a system; and generating code from the executable model based on the analyzing, wherein the generating comprises: (1) generating one or more service access points for the code, wherein the one or more service access points interface with the RTE and call the RTE service code to implement the RTE service, and (2) determining a location for each of the one or more service access points in the code, wherein the generated code when executed satisfies the deployment specifications, or determining an implementation, of a plurality of different implementations, for the RTE service based on the analysis of the one or more model constraints and the one or more deployment specifications, wherein the RTE service is configured to be implemented in a plurality of different ways utilizing the plurality of different implementations, wherein the determined implementation satisfies the deployment specifications.

2. The one or more non-transitory computer-readable media of claim 1, wherein a functionality in the executable model that needs the RTE service is one of a rate transition block, a sine wave, an integrator, an error status, an output port, an input port, or a parameter.

3. The one or more non-transitory computer-readable media of claim 1, wherein the one or more model constraints are determined by analyzing one or more model parameters of the executable model utilizing one or more algorithms or techniques, and wherein the one or model constraints affect one or more of timing, coherency, or latency of data associated with the executable model.

4. The one or more non-transitory computer-readable media of claim 1, wherein
the one or more deployment specifications are one or more RTE specifications and the one or more RTE specifications describe one or more of a scheduling technique utilized by the RTE when the RTE service code executes, an intra process communication technique utilized by the RTE when the RTE service code executes, or a basic service utilized by the RTE when the RTE service code executes, or
the one or more deployment specifications are one or more operating system (OS) specifications and the one or more OS specifications describe one or more of a process management technique utilized by the RTE when the RTE service code executes, a clock synchronization technique utilized by the RTE when the RTE service code executes, the intra process communication technique utilized by the RTE when the RTE service code executes, or the basic service utilized by the RTE when the RTE service code executes.

5. The one or more non-transitory computer-readable media of claim 1, where the code for the executable model is generated, the instructions cause the computing device to perform operations further comprising:
modifying the one or more deployment specifications to produce one or more modified deployment specifications;
analyzing the one or more model constraints of the executable model and the one or more modified deployment specifications; and
generating, without modifying the executable model, the code from the executable model based on the analyzing the one or more model constraints of the executable model and the one or more modified deployment specifications, wherein the generating comprises:
generating the one or more service access points for the code, wherein the one or more service access points interface with the RTE and call the RTE service code to implement the RTE service, and
determining a different location for each of the one or more service access points in the code.

6. The one or more non-transitory computer-readable media of claim 1, where the code for the executable model is generated, the instructions cause the computing device to perform operations further comprising:
receiving one or more different deployment specifications that describe the one or more operations of a different RTE that implements a different RTE service;
analyzing the one or more model constraints of the executable model and the one or more different deployment specifications; and
generating different code from the executable model and for the different RTE based on the analyzing, wherein the generating comprises:
generating one or more different service access points for the different code, wherein the one or more different service access points interface with the RTE and call different RTE service code to implement the different RTE service, and
determining a different location for each of the one or more different service access points in the different code.

7. The one or more non-transitory computer-readable media of claim 1, where the code for the executable model is generated, the code is utilized with a plurality of different RTEs.

8. The one or more non-transitory computer-readable media of claim 1, where the implementation is determined, the instructions cause the computing device to perform operations further comprising:
receiving one or more different deployment specifications;
analyzing the one or more model constraints of the executable model and the one or more different deployment specifications; and
determining a different implementation, of the plurality of different implementations, for the RTE service based on the analysis of the one or more model constraints and the one or more different deployment specifications.

9. The one or more non-transitory computer-readable media of claim 8, wherein the implementation and the different implementation are a same implementation.

10. The one or more non-transitory computer-readable media of claim 8, wherein the implementation and the different implementation are different implementations.

11. The one or more non-transitory computer-readable media of claim 1, where the code for the executable model is generated, the instructions cause the computing device to perform operations further comprising:
determining, based on the analyzing, a model location in the model for a selected service access point of the one or more service access points;
inserting a graphical affordance representing the selected service access point at the determined model location in the model; and
displaying, on a display device, the model with the inserted graphical affordance.

12. The one or more non-transitory computer-readable media of claim 1, where the code for the executable model is generated, the instructions cause the computing device to perform operations further comprising:
determining one or more deployment constraints associated with a target system on which the generated code is to be deployed,
wherein the analyzing is based on the one or more model constraints, the one or more deployment specifications, and the one or more deployment constraints.

13. A method, comprising:
identifying, by a processor, a functionality in an executable model that needs a runtime environment (RTE)

service to be implemented by an RTE, wherein the executable model when executed simulating a behavior of a system;

receiving one or more deployment specifications that describe one or more operations of the RTE when executing RTE service code to implement the RTE service;

analyzing one or more model constraints of the executable model and the one or more deployment specifications; and generating code from the executable model based on the analyzing, wherein the generating comprises: (1) generating one or more service access points for the code, wherein the one or more service access points interface with the RTE and call the RTE service code to implement the RTE service, and (2) determining a location for each of the one or more service access points in the code, wherein the generated code when executed satisfies the deployment specifications, or determining an implementation, of a plurality of different implementations, for the RTE service based on the analysis of the one or more model constraints and the one or more deployment specifications, wherein the RTE service is configured to be implemented in a plurality of different ways utilizing the plurality of different implementations, wherein the determined implementation satisfies the deployment specifications.

14. The method of claim 13, wherein the functionality is one of a rate transition block, a sine wave, an integrator, an error status, an output port, an input port, or a parameter.

15. The method of claim 13, wherein the one or more model constraints are determined by analyzing one or more model parameters of the executable model utilizing one or more algorithms or techniques, and wherein the one or model constraints affect one or more of timing, coherency, or latency of data associated with the executable model.

16. The method of claim 13, wherein the one or more deployment specifications are one or more RTE specifications and the one or more RTE specifications describe one or more of a scheduling technique utilized by the RTE when the RTE service code executes, an intra process communication technique utilized by the RTE when the RTE service code executes, or a basic service utilized by the RTE when the RTE service code executes, or the one or more deployment specifications are one or more operating system (OS) specifications and the one or more OS specifications describe one or more of a process management technique utilized by the RTE when the RTE service code executes, a clock synchronization technique utilized by the RTE when the RTE service code executes, the intra process communication technique utilized by the RTE when the RTE service code executes, or the basic service utilized by the RTE when the RTE service code executes.

17. The method of claim 13, where the code for the executable model is generated, the method further comprising:

modifying the one or more deployment specifications to produce one or more modified deployment specifications;

analyzing the one or more model constraints of the executable model and the one or more modified deployment specifications; and generating, without modifying the executable model, the code from the executable model based on the analyzing the one or more model constraints of the executable model and the one or more modified deployment specifications, wherein the generating comprises:

generating the one or more service access points for the code, wherein the one or more service access points interface with the RTE and call the RTE service code to implement the RTE service, and determining a different location for each of the one or more service access points in the code.

18. The method of claim 13, where the code for the executable model is generated, the method further comprising:

receiving one or more different deployment specifications that describe the one or more operations of a different RTE that implements a different RTE service;

analyzing the one or more model constraints of the executable model and the one or more different deployment specifications; and generating different code from the executable model and for the different RTE based on the analyzing, wherein the generating comprises:

generating one or more different service access points for the different code, wherein the one or more different service access points interface with the RTE and call different RTE service code to implement the different RTE service, and determining a different location for each of the one or more different service access points in the different code.

19. The method of claim 13, where the code for the executable model is generated, the code is utilized with a plurality of different RTEs.

20. A system, comprising:

a processor coupled to a memory, the processor configured to:

identify a functionality in an executable model that needs a runtime environment (RTE) service to be implemented by an RTE, wherein the executable model when executed simulating a behavior of a system;

receive one or more deployment specifications that describe one or more operations of the RTE when executing RTE service code to implement an RTE service;

analyze one or more model constraints of the executable model and the one or more deployment specifications; and generate code from the executable model based on the analyzing, wherein the generating comprises: (1) generating one or more service access points for the code, wherein the one or more service access points interface with the RTE and call the RTE service code to implement the RTE service, and (2) determining a location for each of the one or more service access points in the code, wherein the generated code when executed satisfies the deployment specifications, or determine an implementation, of a plurality of different implementations, for the RTE service based on the analysis of the one or more model constraints and the one or more deployment specifications, wherein the RTE service is configured to be implemented in a plurality of different ways utilizing the plurality of different implementations, wherein the determined implementation satisfies the deployment specifications.

21. The method of claim 13, where the implementation is determined, the method further comprising:

receiving one or more different deployment specifications;

analyzing the one or more model constraints of the executable model and the one or more different deployment specifications; and determining a different implementation, of the plurality of different implementations, for the RTE service based on the analysis of the one or more model constraints and the one or more different deployment specifications.

22. The method of claim 21, wherein the implementation and the different implementation are a same implementation.

23. The method of claim 13, where the code for the executable model is generated, the method further comprising:

determining, based on the analyzing, a model location in the model for a selected service access point of the one or more service access points;

inserting a graphical affordance representing the selected service access point at the determined model location in the model; and displaying, on a display device, the model with the inserted graphical affordance.

24. The method of claim 13, where the code for the executable model is generated, the method further comprising:

determining one or more deployment constraints associated with a target system on which the generated code is to be deployed, wherein the analyzing is based on the one or more model constraints, the one or more deployment specifications, and the one or more deployment constraints.

* * * * *

UNITED STATES PATENT AND TRADEMARK OFFICE
CERTIFICATE OF CORRECTION

| | | |
|---|---|---|
| PATENT NO. | : 11,755,294 B2 | |
| APPLICATION NO. | : 17/332205 | |
| DATED | : September 12, 2023 | |
| INVENTOR(S) | : Biao Yu et al. | |

It is certified that error appears in the above-identified patent and that said Letters Patent is hereby corrected as shown below:

In the Specification

Column 7, Line 24:
"latency. For example, Simulink® Design Optization™, from"
Should read:
"latency. For example, Simulink® Design Optimization™, from"

Signed and Sealed this
Eighteenth Day of June, 2024

Katherine Kelly Vidal
*Director of the United States Patent and Trademark Office*